United States Patent
Vaish et al.

(10) Patent No.: US 12,282,604 B2
(45) Date of Patent: Apr. 22, 2025

(54) TOUCH-BASED AUGMENTED REALITY EXPERIENCE

(71) Applicant: Snap Inc., Santa Monica, CA (US)

(72) Inventors: Rajan Vaish, Beverly Hills, CA (US); Sven Kratz, Mercer Island, WA (US); Andrés Monroy-Hernández, Princeton, NJ (US); Brian Anthony Smith, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/056,142

(22) Filed: Nov. 16, 2022

(65) Prior Publication Data
US 2024/0069637 A1    Feb. 29, 2024

Related U.S. Application Data

(60) Provisional application No. 63/402,905, filed on Aug. 31, 2022.

(51) Int. Cl.
| | |
|---|---|
| *G06F 3/01* | (2006.01) |
| *G06F 3/16* | (2006.01) |
| *G06T 19/00* | (2011.01) |

(52) U.S. Cl.
CPC ............... *G06F 3/016* (2013.01); *G06F 3/16* (2013.01); *G06T 19/006* (2013.01)

(58) Field of Classification Search
None
See application file for complete search history.

(56) References Cited

U.S. PATENT DOCUMENTS

| | | |
|---|---|---|
| 4,807,158 A | 2/1989 | Blanton et al. |
| 6,038,295 A | 3/2000 | Mattes |
| | (Continued) | |

FOREIGN PATENT DOCUMENTS

| | | |
|---|---|---|
| CA | 2887596 A1 | 7/2015 |
| CN | 105912129 | 8/2016 |
| | (Continued) | |

OTHER PUBLICATIONS

US 10,656,660 B1, 05/2020, Meisenholder et al. (withdrawn)
(Continued)

*Primary Examiner* — Amare Mengistu
*Assistant Examiner* — Sarvesh J Nadkarni
(74) *Attorney, Agent, or Firm* — Schwegman Lundberg & Woessner, P.A.

(57) ABSTRACT

The present disclosure relates to methods and systems for providing a touch-based augmented reality (AR) experience. During a capture phase, a first user may grip an object. An intensity of a force applied on the object in the grip and/or a duration of the grip may be recorded. A volumetric representation of the first user holding the object may also be captured. During an experience phase, a second user may touch the object, the object may provide haptic feedback (e.g., a vibration) to the second user at an intensity and a duration corresponding to an intensity of the force applied on the object and a duration of the grip of the object. If a volumetric representation of the first user holding the object is captured, touching the object may also cause a presentation of the first user's volumetric body that holds the object.

20 Claims, 16 Drawing Sheets

(56) References Cited

U.S. PATENT DOCUMENTS

| | | |
|---|---|---|
| 6,430,997 B1 | 8/2002 | French et al. |
| 6,819,982 B2 | 11/2004 | Doane |
| 6,980,909 B2 | 12/2005 | Root et al. |
| 7,173,651 B1 | 2/2007 | Knowles |
| 7,190,496 B2 | 3/2007 | Klug et al. |
| 7,411,493 B2 | 8/2008 | Smith |
| 7,535,890 B2 | 5/2009 | Rojas |
| 7,542,073 B2 | 6/2009 | Li et al. |
| 8,046,719 B2 | 10/2011 | Skourup et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,608,563 B2 | 12/2013 | Miyazaki et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,934,015 B1 | 1/2015 | Chi et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,186,548 B2 | 11/2015 | House et al. |
| 9,191,776 B2 | 11/2015 | Root et al. |
| 9,204,252 B2 | 12/2015 | Root |
| 9,235,932 B2 | 1/2016 | Choi et al. |
| 9,344,642 B2 | 5/2016 | Niemi et al. |
| 9,345,711 B2 | 5/2016 | Friedhoff |
| 9,443,227 B2 | 9/2016 | Evans et al. |
| 9,445,081 B1 | 9/2016 | Kouperman et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,703,369 B1 | 7/2017 | Mullen |
| 9,723,272 B2 | 8/2017 | Lu et al. |
| 9,747,901 B1 | 8/2017 | Gentry |
| 9,761,057 B2 | 9/2017 | Salter et al. |
| 9,779,538 B2 | 10/2017 | Sanders et al. |
| 9,794,527 B1 | 10/2017 | Balez et al. |
| 9,818,225 B2 | 11/2017 | Wang et al. |
| 9,916,673 B2 | 3/2018 | Castro et al. |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,282,903 B1 | 5/2019 | Clark et al. |
| 10,289,193 B2 | 5/2019 | Hardy et al. |
| 10,313,481 B2 | 6/2019 | Kada |
| 10,325,410 B1 | 6/2019 | Smith et al. |
| 10,365,784 B2 | 7/2019 | Inomata |
| 10,370,118 B1 | 8/2019 | Nielsen et al. |
| 10,403,050 B1 | 9/2019 | Beall et al. |
| 10,445,925 B2 | 10/2019 | Tokubo |
| 10,482,665 B2 | 11/2019 | Copic et al. |
| 10,501,180 B2 | 12/2019 | Yu |
| 10,504,277 B1 | 12/2019 | Haitani et al. |
| 10,581,940 B1 | 3/2020 | Iyer et al. |
| 10,599,286 B2 | 3/2020 | Inomata |
| 10,616,663 B2 | 4/2020 | Davisson et al. |
| 10,768,639 B1 | 9/2020 | Meisenholder et al. |
| 10,768,776 B1 | 9/2020 | Roche et al. |
| 10,796,489 B1 | 10/2020 | Cordes et al. |
| 10,819,946 B1 | 10/2020 | Tanumihardja et al. |
| 10,901,215 B1 | 1/2021 | Newcombe et al. |
| 10,937,239 B2 | 3/2021 | Huston et al. |
| 11,006,095 B2 | 5/2021 | Holzer et al. |
| 11,051,049 B2 | 6/2021 | Bustamante et al. |
| 11,062,517 B2 | 7/2021 | Crews et al. |
| 11,094,127 B2 | 8/2021 | Mccall |
| 11,126,206 B2 | 9/2021 | Meisenholder et al. |
| 11,145,123 B1 | 10/2021 | Chor et al. |
| 11,156,830 B2 | 10/2021 | Johnson et al. |
| 11,194,439 B2 | 12/2021 | Laaksonen et al. |
| 11,200,028 B2 | 12/2021 | Newell et al. |
| 11,200,742 B1 | 12/2021 | Post et al. |
| 11,302,077 B2 | 4/2022 | Kang et al. |
| 11,372,474 B2 | 6/2022 | Schweet et al. |
| 11,413,514 B2 | 8/2022 | Marty et al. |
| 11,436,806 B1 | 9/2022 | Katz |
| 11,468,605 B2 | 10/2022 | Corson |
| 11,481,423 B1 | 10/2022 | Singleton |
| 11,481,980 B2 | 10/2022 | Yerli |
| 11,495,004 B1 | 11/2022 | Henry |
| 11,623,138 B2 | 4/2023 | Yeh et al. |
| 11,734,905 B1 | 8/2023 | Henry |
| 11,810,259 B2 | 11/2023 | Ramani et al. |
| 11,847,749 B2 | 12/2023 | Lebeaupin et al. |
| 11,941,764 B2 | 3/2024 | Harding et al. |
| 11,972,521 B2 | 4/2024 | Vaish et al. |
| 2004/0135890 A1 | 7/2004 | Kaneko et al. |
| 2006/0287025 A1 | 12/2006 | French |
| 2007/0167689 A1 | 7/2007 | Ramadas et al. |
| 2007/0250526 A1 | 10/2007 | Hanna |
| 2008/0081676 A1 | 4/2008 | Chakraborty et al. |
| 2008/0158256 A1 | 7/2008 | Russell et al. |
| 2008/0186255 A1 | 8/2008 | Cohen et al. |
| 2008/0211771 A1 | 9/2008 | Richardson |
| 2008/0255842 A1 | 10/2008 | Simhi |
| 2009/0122133 A1 | 5/2009 | Hartman |
| 2009/0171902 A1 | 7/2009 | Maclaurin et al. |
| 2009/0187389 A1 | 7/2009 | Dobbins et al. |
| 2009/0213114 A1 | 8/2009 | Dobbins et al. |
| 2010/0026809 A1 | 2/2010 | Curry |
| 2010/0125799 A1 | 5/2010 | Roberts et al. |
| 2010/0185984 A1 | 7/2010 | Wright et al. |
| 2010/0260422 A1 | 10/2010 | Ito et al. |
| 2011/0179313 A1 | 7/2011 | Macdonald et al. |
| 2011/0202598 A1 | 8/2011 | Evans et al. |
| 2011/0242134 A1 | 10/2011 | Miller et al. |
| 2011/0261083 A1* | 10/2011 | Wilson .................. G06F 3/016 345/676 |
| 2012/0027278 A1 | 2/2012 | Chaney et al. |
| 2012/0052947 A1 | 3/2012 | Yun |
| 2012/0131125 A1 | 5/2012 | Seidel et al. |
| 2012/0188452 A1 | 7/2012 | Keiser et al. |
| 2012/0194420 A1 | 8/2012 | Osterhout et al. |
| 2012/0209924 A1 | 8/2012 | Evans et al. |
| 2012/0263154 A1 | 10/2012 | Blanchflower et al. |
| 2012/0281885 A1 | 11/2012 | Syrdal et al. |
| 2012/0287274 A1 | 11/2012 | Bevirt |
| 2012/0320169 A1 | 12/2012 | Bathiche |
| 2013/0056581 A1 | 3/2013 | Sparks |
| 2013/0072296 A1 | 3/2013 | Miyazaki et al. |
| 2013/0083009 A1 | 4/2013 | Geisner et al. |
| 2013/0083173 A1 | 4/2013 | Geisner et al. |
| 2013/0162632 A1 | 6/2013 | Varga et al. |
| 2013/0238168 A1 | 9/2013 | Reyes |
| 2014/0013228 A1 | 1/2014 | Hutten |
| 2014/0038708 A1 | 2/2014 | Davison et al. |
| 2014/0254896 A1 | 9/2014 | Zhou et al. |
| 2014/0285522 A1 | 9/2014 | Kim et al. |
| 2014/0357366 A1 | 12/2014 | Koganezawa et al. |
| 2014/0368542 A1 | 12/2014 | Tawara et al. |
| 2015/0015486 A1 | 1/2015 | Osman et al. |
| 2015/0015608 A1 | 1/2015 | Park |
| 2015/0016777 A1 | 1/2015 | Abovitz et al. |
| 2015/0022432 A1 | 1/2015 | Stewart et al. |
| 2015/0035862 A1 | 2/2015 | Fischer et al. |
| 2015/0070272 A1 | 3/2015 | Kim et al. |
| 2015/0175263 A1 | 6/2015 | Reyes |
| 2015/0193979 A1 | 7/2015 | Grek |
| 2015/0199022 A1 | 7/2015 | Gottesman et al. |
| 2015/0287246 A1 | 10/2015 | Huston et al. |
| 2015/0331490 A1 | 11/2015 | Yamada |

(56) References Cited

U.S. PATENT DOCUMENTS

| | | |
|---|---|---|
| 2015/0355711 A1 | 12/2015 | Rihn |
| 2015/0362917 A1 | 12/2015 | Wang et al. |
| 2015/0363034 A1* | 12/2015 | Hinckley ............ G06F 3/017 345/173 |
| 2016/0004390 A1 | 1/2016 | Laska et al. |
| 2016/0027218 A1 | 1/2016 | Salter et al. |
| 2016/0049003 A1 | 2/2016 | Shuster et al. |
| 2016/0063987 A1 | 3/2016 | Xu et al. |
| 2016/0071548 A1 | 3/2016 | House et al. |
| 2016/0133230 A1 | 5/2016 | Daniels et al. |
| 2016/0161946 A1 | 6/2016 | Wuth Sepulveda et al. |
| 2016/0179096 A1 | 6/2016 | Bradlow et al. |
| 2016/0217623 A1 | 7/2016 | Singh |
| 2016/0292575 A1 | 10/2016 | Weast et al. |
| 2016/0292886 A1 | 10/2016 | Erad et al. |
| 2016/0307335 A1 | 10/2016 | Perry et al. |
| 2016/0307573 A1 | 10/2016 | Wobrock |
| 2016/0330532 A1 | 11/2016 | Bostick et al. |
| 2016/0336020 A1 | 11/2016 | Bradlow et al. |
| 2016/0350973 A1 | 12/2016 | Shapira et al. |
| 2016/0357258 A1* | 12/2016 | Yeom ............ G06F 3/011 |
| 2017/0031369 A1 | 2/2017 | Liu et al. |
| 2017/0061700 A1 | 3/2017 | Urbach et al. |
| 2017/0084051 A1 | 3/2017 | Weising et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0208103 A1 | 7/2017 | Sarmova |
| 2017/0225796 A1 | 8/2017 | Sun et al. |
| 2017/0228690 A1 | 8/2017 | Kohli |
| 2017/0237940 A1 | 8/2017 | Chaney et al. |
| 2017/0244937 A1 | 8/2017 | Meier et al. |
| 2017/0256040 A1 | 9/2017 | Grauer |
| 2017/0266554 A1 | 9/2017 | Marks et al. |
| 2017/0269685 A1 | 9/2017 | Marks et al. |
| 2017/0320564 A1 | 11/2017 | Kuzikov |
| 2017/0324841 A1 | 11/2017 | Clement et al. |
| 2017/0337791 A1 | 11/2017 | Gordon-carroll |
| 2017/0359624 A1 | 12/2017 | Englert et al. |
| 2017/0364153 A1 | 12/2017 | Kazansky et al. |
| 2017/0365098 A1 | 12/2017 | Auten et al. |
| 2017/0365102 A1 | 12/2017 | Huston et al. |
| 2017/0371353 A1 | 12/2017 | Millinger, III |
| 2018/0005429 A1 | 1/2018 | Osman et al. |
| 2018/0059783 A1 | 3/2018 | Van Hoff et al. |
| 2018/0082682 A1 | 3/2018 | Erickson et al. |
| 2018/0098059 A1 | 4/2018 | Valdivia et al. |
| 2018/0130257 A1 | 5/2018 | Moran |
| 2018/0154232 A1 | 6/2018 | Gentil |
| 2018/0190033 A1 | 7/2018 | Barnett et al. |
| 2018/0246529 A1 | 8/2018 | Hu et al. |
| 2018/0270427 A1 | 9/2018 | Damstra et al. |
| 2018/0288364 A1 | 10/2018 | Virhia |
| 2018/0311585 A1 | 11/2018 | Osman |
| 2018/0329486 A1 | 11/2018 | Williams et al. |
| 2019/0005546 A1 | 1/2019 | Chen et al. |
| 2019/0005728 A1 | 1/2019 | Leppanen et al. |
| 2019/0011921 A1 | 1/2019 | Wang et al. |
| 2019/0054379 A1 | 2/2019 | Ackley et al. |
| 2019/0073831 A1 | 3/2019 | Kim |
| 2019/0073832 A1 | 3/2019 | Kim |
| 2019/0130599 A1 | 5/2019 | Gebbie et al. |
| 2019/0130631 A1 | 5/2019 | Gebbie et al. |
| 2019/0138260 A1 | 5/2019 | Rogers et al. |
| 2019/0172265 A1 | 6/2019 | Cossairt et al. |
| 2019/0182471 A1 | 6/2019 | Khalid et al. |
| 2019/0188895 A1 | 6/2019 | Miller et al. |
| 2019/0199993 A1 | 6/2019 | Babu J D et al. |
| 2019/0208189 A1 | 7/2019 | Lau et al. |
| 2019/0217189 A1 | 7/2019 | Gutierrez et al. |
| 2019/0278369 A1 | 9/2019 | Ballard |
| 2019/0325654 A1 | 10/2019 | Stisser et al. |
| 2019/0358547 A1 | 11/2019 | Mack et al. |
| 2020/0020136 A1 | 1/2020 | Hwang et al. |
| 2020/0042160 A1 | 2/2020 | Gabbi et al. |
| 2020/0043235 A1 | 2/2020 | Chapman et al. |
| 2020/0066043 A1 | 2/2020 | Graham et al. |
| 2020/0097077 A1 | 3/2020 | Nguyen et al. |
| 2020/0098179 A1 | 3/2020 | Gough et al. |
| 2020/0098191 A1 | 3/2020 | Mccall |
| 2020/0101372 A1 | 4/2020 | Drake et al. |
| 2020/0126257 A1 | 4/2020 | Tauber |
| 2020/0134911 A1 | 4/2020 | Van Hoff et al. |
| 2020/0159361 A1 | 5/2020 | Rosenberg et al. |
| 2020/0162779 A1 | 5/2020 | Saxena |
| 2020/0169715 A1 | 5/2020 | Liu et al. |
| 2020/0171394 A1 | 6/2020 | Khan et al. |
| 2020/0241575 A1 | 7/2020 | Meisenholder et al. |
| 2020/0242840 A1 | 7/2020 | Logan et al. |
| 2020/0257367 A1 | 8/2020 | Rihn et al. |
| 2020/0260149 A1 | 8/2020 | Ding et al. |
| 2020/0273243 A1 | 8/2020 | Duffy et al. |
| 2020/0279407 A1 | 9/2020 | Liljeroos et al. |
| 2020/0289935 A1 | 9/2020 | Azmandian et al. |
| 2020/0314323 A1 | 10/2020 | Van Geel et al. |
| 2020/0341541 A1 | 10/2020 | Olah-Reiken et al. |
| 2020/0349751 A1 | 11/2020 | Bentovim et al. |
| 2020/0371737 A1 | 11/2020 | Leppänen et al. |
| 2020/0394012 A1 | 12/2020 | Wright, Jr. et al. |
| 2020/0409451 A1 | 12/2020 | Mukherjea et al. |
| 2021/0096543 A1 | 4/2021 | Stump et al. |
| 2021/0142578 A1 | 5/2021 | Weinheimer et al. |
| 2021/0159980 A1 | 5/2021 | Ben-Yehuda et al. |
| 2021/0232632 A1 | 7/2021 | Howard |
| 2021/0272367 A1 | 9/2021 | Richter |
| 2021/0279962 A1 | 9/2021 | Hutten et al. |
| 2021/0286179 A1 | 9/2021 | Miller, IV et al. |
| 2021/0287452 A1 | 9/2021 | Maruyama |
| 2021/0289317 A1 | 9/2021 | Son et al. |
| 2021/0312684 A1 | 10/2021 | Zimmermann et al. |
| 2021/0327145 A1 | 10/2021 | Noorkami et al. |
| 2021/0362848 A1 | 11/2021 | Spencer |
| 2021/0382503 A1 | 12/2021 | Meisenholder et al. |
| 2021/0390953 A1 | 12/2021 | Makker et al. |
| 2021/0394046 A1 | 12/2021 | Yen et al. |
| 2021/0405772 A1 | 12/2021 | Canberk et al. |
| 2021/0407178 A1 | 12/2021 | Zhou et al. |
| 2021/0409502 A1 | 12/2021 | Chepizhenko et al. |
| 2022/0014723 A1 | 1/2022 | Pandey et al. |
| 2022/0028108 A1 | 1/2022 | Haapoja et al. |
| 2022/0028170 A1* | 1/2022 | Haapoja ............ G06T 7/70 |
| 2022/0053219 A1 | 2/2022 | Bathory |
| 2022/0101593 A1* | 3/2022 | Rockel ............ A63F 13/426 |
| 2022/0103969 A1 | 3/2022 | Drummond et al. |
| 2022/0108539 A1 | 4/2022 | Nussbaum et al. |
| 2022/0116581 A1 | 4/2022 | Miyata et al. |
| 2022/0124143 A1 | 4/2022 | Rafkind et al. |
| 2022/0139055 A1 | 5/2022 | Palmaro |
| 2022/0146833 A1 | 5/2022 | Miller, IV et al. |
| 2022/0164491 A1 | 5/2022 | Palmaro |
| 2022/0189075 A1 | 6/2022 | Lynch et al. |
| 2022/0197485 A1 | 6/2022 | Goodrich et al. |
| 2022/0198603 A1 | 6/2022 | Goodrich et al. |
| 2022/0230663 A1 | 7/2022 | Sun et al. |
| 2022/0242450 A1 | 8/2022 | Sokolov et al. |
| 2022/0244835 A1 | 8/2022 | Faulkner et al. |
| 2022/0247929 A1 | 8/2022 | Yang et al. |
| 2022/0269336 A1 | 8/2022 | Lafontaine et al. |
| 2022/0274026 A1 | 9/2022 | Steigelfest et al. |
| 2022/0362631 A1 | 11/2022 | Hong |
| 2022/0382255 A1 | 12/2022 | Lee |
| 2023/0010754 A1 | 1/2023 | Saxena |
| 2023/0063505 A1 | 3/2023 | Chastain et al. |
| 2023/0139337 A1 | 5/2023 | Noam et al. |
| 2023/0173367 A1 | 6/2023 | Marty et al. |
| 2023/0179641 A1 | 6/2023 | Bauer et al. |
| 2023/0214082 A1 | 7/2023 | Kang |
| 2023/0237192 A1 | 7/2023 | Kahan et al. |
| 2023/0316681 A1 | 10/2023 | Dolev et al. |
| 2023/0334754 A1 | 10/2023 | Kirchmayer et al. |
| 2023/0341928 A1 | 10/2023 | Traynor et al. |
| 2023/0342989 A1 | 10/2023 | Lehtiniemi et al. |
| 2023/0409114 A1* | 12/2023 | Sun ............ H02N 1/04 |

(56) References Cited

U.S. PATENT DOCUMENTS

| | | | |
|---|---|---|---|
| 2023/0412480 | A1 | 12/2023 | Greyson et al. |
| 2024/0005623 | A1 | 1/2024 | Cooper et al. |
| 2024/0069626 | A1 | 2/2024 | Vaish et al. |
| 2024/0069627 | A1 | 2/2024 | Vaish et al. |
| 2024/0070969 | A1 | 2/2024 | Vaish et al. |
| 2024/0071004 | A1 | 2/2024 | Vaish et al. |
| 2024/0071006 | A1 | 2/2024 | Kratz et al. |
| 2024/0071007 | A1 | 2/2024 | Vaish et al. |
| 2024/0071008 | A1 | 2/2024 | Vaish et al. |
| 2024/0073402 | A1 | 2/2024 | Vaish et al. |
| 2024/0073404 | A1 | 2/2024 | Vaish et al. |
| 2024/0119679 | A1 | 4/2024 | Canberk et al. |
| 2024/0119682 | A1 | 4/2024 | Rudman et al. |
| 2024/0233224 | A1* | 7/2024 | Fan ..................... G06V 20/70 |
| 2024/0273832 | A1 | 8/2024 | Newman et al. |

FOREIGN PATENT DOCUMENTS

| | | |
|---|---|---|
| JP | 2010061452 | 3/2010 |
| KR | 20200014587 | 2/2020 |
| KR | 20200109812 | 9/2020 |
| KR | 20210065423 | 6/2021 |
| KR | 20210135859 | 11/2021 |
| KR | 20220064130 | 5/2022 |
| WO | 2016105839 | 6/2016 |
| WO | 2021002788 | 1/2021 |
| WO | 2024049687 | 3/2024 |
| WO | 2024049700 | 3/2024 |
| WO | 2024050229 | 3/2024 |
| WO | 2024050231 | 3/2024 |
| WO | 2024050232 | 3/2024 |
| WO | 2024050245 | 3/2024 |
| WO | 2024050246 | 3/2024 |
| WO | 2024050262 | 3/2024 |
| WO | 2024050264 | 3/2024 |

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 2017, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.
"International Application Serial No. PCT US2023 072701, International Search Report mailed Dec. 1, 2023", 3 pgs.
"International Application Serial No. PCT US2023 072701, Written Opinion mailed Dec. 1, 2023", 4 pgs.
"U.S. Appl. No. 17/899,970, Non Final Office Action mailed Jul. 3, 2023", 22 pgs.
"U.S. Appl. No. 17/899,970, Response filed Oct. 3, 2023 to Non Final Office Action mailed Jul. 3, 2023", 11 pgs.
"U.S. Appl. No. 17/900,200, Non Final Office Action mailed Nov. 8, 2023", 26 pgs.
"International Application Serial No. PCT US2023 072274, International Search Report mailed Nov. 28, 2023", 3 pgs.
"International Application Serial No. PCT US2023 072274, Written Opinion mailed Nov. 28, 2023", 4 pgs.
"International Application Serial No. PCT US2023 072568, International Search Report mailed Dec. 5, 2023", 3 pgs.
"International Application Serial No. PCT US2023 072568, Written Opinion mailed Dec. 5, 2023", 4 pgs.
"International Application Serial No. PCT US2023 072718, International Search Report mailed Dec. 1, 2023", 3 pgs.
"International Application Serial No. PCT US2023 072718, Written Opinion mailed Dec. 1, 2023", 4 pgs.
"International Application Serial No. PCT US2023 072282, International Search Report mailed Dec. 1, 2023", 4 pgs.
"International Application Serial No. PCT US2023 072282, Written Opinion mailed Dec. 1, 2023", 4 pgs.
"International Application Serial No. PCT US2023 072277, Written Opinion mailed Dec. 8, 2023", 4 pgs.
"International Application Serial No. PCT US2023 072277, International Search Report mailed Dec. 8, 2023", 4 pgs.
"International Application Serial No. PCT US2023 030926, Written Opinion mailed Dec. 12, 2023", 4 pgs.
"International Application Serial No. PCT US2023 030926, International Search Report mailed Dec. 12, 2023", 3 pgs.
"International Application Serial No. PCT US2023 072557, International Search Report mailed Dec. 12, 2023", 3 pgs.
"International Application Serial No. PCT US2023 072557, Written Opinion mailed Dec. 12, 2023", 4 pgs.
"International Application Serial No. PCT US2023 072726, Written Opinion mailed Dec. 12, 2023", 4 pgs.
"International Application Serial No. PCT US2023 072726, International Search Report mailed Dec. 12, 2023", 3 pgs.
"International Application Serial No. PCT US2023 031066, Written Opinion mailed Dec. 15, 2023", 3 pgs.
"International Application Serial No. PCT US2023 031066, International Search Report mailed Dec. 15, 2023", 3 pgs.
"U.S. Appl. No. 17/900,200, Response filed Jan. 31, 2024 to Non Final Office Action mailed Nov. 8, 2023", 14 pgs.
"U.S. Appl. No. 17/899,970, Notice of Allowance mailed Dec. 20, 2023", 9 pgs.
"U.S. Appl. No. 17/899,970, Corrected Notice of Allowability mailed Jan. 3, 2024", 5 pgs.
"U.S. Appl. No. 17/900,407, Non Final Office Action mailed Feb. 9, 2024", 11 pgs.
"U.S. Appl. No. 18/058,175, Non Final Office Action mailed Mar. 11, 2024", 14 pgs.
"U.S. Appl. No. 17/899,970, Supplemental Notice of Allowability mailed Mar. 27, 2024", 2 pgs.
"U.S. Appl. No. 17/900,407, Response filed Apr. 23, 2024 to Non Final Office Action mailed Feb. 9, 2024", 12 pgs.
"U.S. Appl. No. 17/899,970, PTO Response to Rule 312 Communication mailed Mar. 27, 2024", 1 page.
"U.S. Appl. No. 17/900,200, Final Office Action mailed May 6, 2024", 32 pgs.
"U.S. Appl. No. 17/899,970, 312 Amendment filed Mar. 20, 2024", 7 pgs.
"U.S. Appl. No. 17/900,407, Examiner Interview Summary mailed Apr. 15, 2024", 2 pgs.
"U.S. Appl. No. 17/899,935, Non Final Office Action mailed Jun. 6, 2024", 13 pgs.
"U.S. Appl. No. 17/900,200, Response filed Aug. 6, 2024 to Final Office Action mailed May 6, 2024", 13 pgs.
"U.S. Appl. No. 18/058,175, Examiner Interview Summary mailed Jun. 7, 2024", 2 pgs.
"U.S. Appl. No. 18/058,175, Response filed Jun. 11, 2024 to Non Final Office Action mailed Mar. 11, 2024", 11 pgs.
Ko, Jonggook, "Hybrid Camera Based Real-Time Human Body Segmentation for Virtual Reality E-learning System", First ACIS JNU International Conference on Computers Networks Systems and Industrial Engineering Jeju Korea South, (2011), 3 pgs.
Langa, Sergi Fernandez, "Multiparty Holomeetings Toward a New Era of Low Cost Volumetric Holographic Meetings in Virtual Reality", IEEE Access vol. 10, (Aug. 3, 2022), 21 pgs.
"U.S. Appl. No. 17/900,407, Final Office Action mailed Aug. 21, 2024", 14 pgs.
"U.S. Appl. No. 17/900,200, Non Final Office Action mailed Aug. 29, 2024", 35 pgs.
"U.S. Appl. No. 18/169,631, Non Final Office Action mailed Sep. 17, 2024", 28 pgs.

(56) References Cited

OTHER PUBLICATIONS

"U.S. Appl. No. 18/058,175, Final Office Action mailed Sep. 19, 2024", 12 pgs.

"U.S. Appl. No. 17/900,436, Non Final Office Action mailed Sep. 23, 2024", 12 pgs.

"U.S. Appl. No. 17/899,935, Response filed Oct. 7, 2024 to Non Final Office Action mailed Jun. 6, 2024", 11 pgs.

"U.S. Appl. No. 17/900,407, Response filed Oct. 18, 2024 to Final Office Action mailed Aug. 21, 2024", 12 pgs.

"U.S. Appl. No. 17/900,407, Advisory Action mailed Oct. 30, 2024", 3 pgs.

"U.S. Appl. No. 18/058,175, Response filed Oct. 30, 2024 to Final Office Action mailed Sep. 19, 2024", 9 pgs.

S. A., Aseeri, "The Influence of Avatar Representation and Behavior on Communication in Social Immersive Virtual Environments", IEEE Conference on Virtual Reality and 3D User Interfaces VR Tuebingen Reutlingen Germany, (2018), 2 pgs.

Yanbin, Wang, "Real Time Stereoscopic Rendering of Realistic Avatar for Interactive 3D Telepresence System", 2nd International Conference on Image Vision and Computing ICIVC Chengdu, (2017), 5 pgs.

U.S. Appl. No. 17/900,200, filed Aug. 31, 2022, Multi-Perspective Augmented Reality Experience.

U.S. Appl. No. 17/900,407, filed Aug. 31, 2022, Controlling and Editing Presentation of Volumetric Content.

U.S. Appl. No. 17/900,436, filed Aug. 31, 2022, Contextual Memory Experience Triggers System.

U.S. Appl. No. 17/899,970, U.S. Pat. No. 11,972,521, filed Aug. 31, 2022, Multisensorial Presentation of Volumetric Content.

U.S. Appl. No. 18/058,175, filed Nov. 22, 2022, Mixing and Matching Volumetric Contents for New Augmented Reality Experiences.

U.S. Appl. No. 17/899,935, filed Aug. 31, 2022, Social Memory Re-Experiencing System.

U.S. Appl. No. 18/169,631, filed Feb. 15, 2023, Multi-Dimensional Experience Presentation Using Augmented Reality.

U.S. Appl. No. 18/170,271, filed Feb. 16, 2023, Generating Immersive Augmented Reality Experiences From Existing Images and Videos.

U.S. Appl No. 17/900,354, filed Aug. 31, 2022, Timelapse Re-Experiencing System.

"U.S. Appl. No. 18/058,175, Notice of Allowance mailed Nov. 15, 2024", 8 pgs.

"U.S. Appl. No. 17/900,407, Notice of Allowance mailed Nov. 27, 2024", 8 pgs.

"U.S. Appl. No. 17/900,200, Response filed Nov. 27, 2024 to Non Final Office Action mailed Aug. 29, 2024", 13 pgs.

"U.S. Appl. No. 18/170,271, Non Final Office Action mailed Nov. 29, 2024", 11 pgs.

"U.S. Appl. No. 17/899,935, Final Office Action mailed Jan. 10, 2025", 13 pgs.

"U.S. Appl. No. 17/900,354, Non Final Office Action mailed Dec. 12, 2024", 17 pgs.

"U.S. Appl. No. 17/900,436, Examiner Interview Summary mailed Jan. 3, 2025", 2 pgs.

"U.S. Appl. No. 17/900,436, Response filed Dec. 20, 2024 to Non Final Office Action mailed Sep. 23, 2024", 12 pgs.

"U.S. Appl. No. 18/058,175, Notice of Allowance mailed Jan. 30, 2025", 8 pgs.

"U.S. Appl. No. 18/169,631, Response filed Dec. 17, 2024 to Non Final Office Action mailed Sep. 17, 2024", 11 pgs.

"U.S. Appl. No. 18/170,271, Notice of Allowance mailed Feb. 4, 2025", 7 pgs.

"U.S. Appl. No. 18/170,271, Response filed Jan. 6, 2025 to Non Final Office Action mailed Nov. 29, 2024", 10 pgs.

* cited by examiner

TOUCH-BASED AUGMENTED REALITY EXPERIENCE

CROSS-REFERENCE TO RELATED APPLICATION

This application claims the benefit of priority to U.S. Provisional Patent Application No. 63/402,905, filed Aug. 31, 2022, and entitled "TOUCH-BASED AUGMENTED REALITY EXPERIENCE," which is herein incorporated by reference in its entirety.

TECHNICAL FIELD

The present disclosure generally relates to mobile and wearable computing technology. In particular, example embodiments of the present disclosure address systems, methods, devices, and user interfaces for providing a touch-based augmented reality (AR) experience that allow users to interact with a smart object.

BACKGROUND

An augmented reality (AR) experience includes application of virtual content to a real-world environment whether through presentation of the virtual content by transparent displays through which a real-world environment is visible or through augmenting image data to include the virtual content overlaid on real-world environments depicted therein. The virtual content can comprise one or more AR content items. An AR content item may include audio content, visual content or a visual effect. Examples of audio and visual content include pictures, texts, logos, animations, and sound effects. A device that supports AR experiences in any one of these approaches is referred to herein as an "AR device."

For some example AR devices, audio and visual content or the visual effects are applied to media data such as a live image stream. Other example AR devices include head-worn devices that may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as 3D renderings, images, video, text, and so forth) that are generated for display to appear as a part of, and/or overlaid upon, the surrounding environment. A user of the head-worn device may access and use a computer software application to perform various tasks or engage in an entertaining activity. To use the computer software application, the user interacts with a 3D user interface provided by the head-worn device.

The so-called "Internet of Things" or "IoT" is a network of physical objects (referred to as "smart devices" or "IoT devices") that are embedded with sensors, software, and other technologies for enabling connection and exchange of data with other devices via the Internet. For example, IoT devices are used in home automation to control lighting, heating and air conditioning, media and security systems, and camera systems. A number of IoT-enabled devices have been provided that function as smart home hubs to connect different smart home products. IoT devices have been used in a number of other applications as well. Application layer protocols and supporting frameworks have been provided for implementing such IoT applications. Artificial intelligence has also been combined with the IoT infrastructure to achieve more efficient IoT operations, improve human-machine interactions, and enhance data management and analytics.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
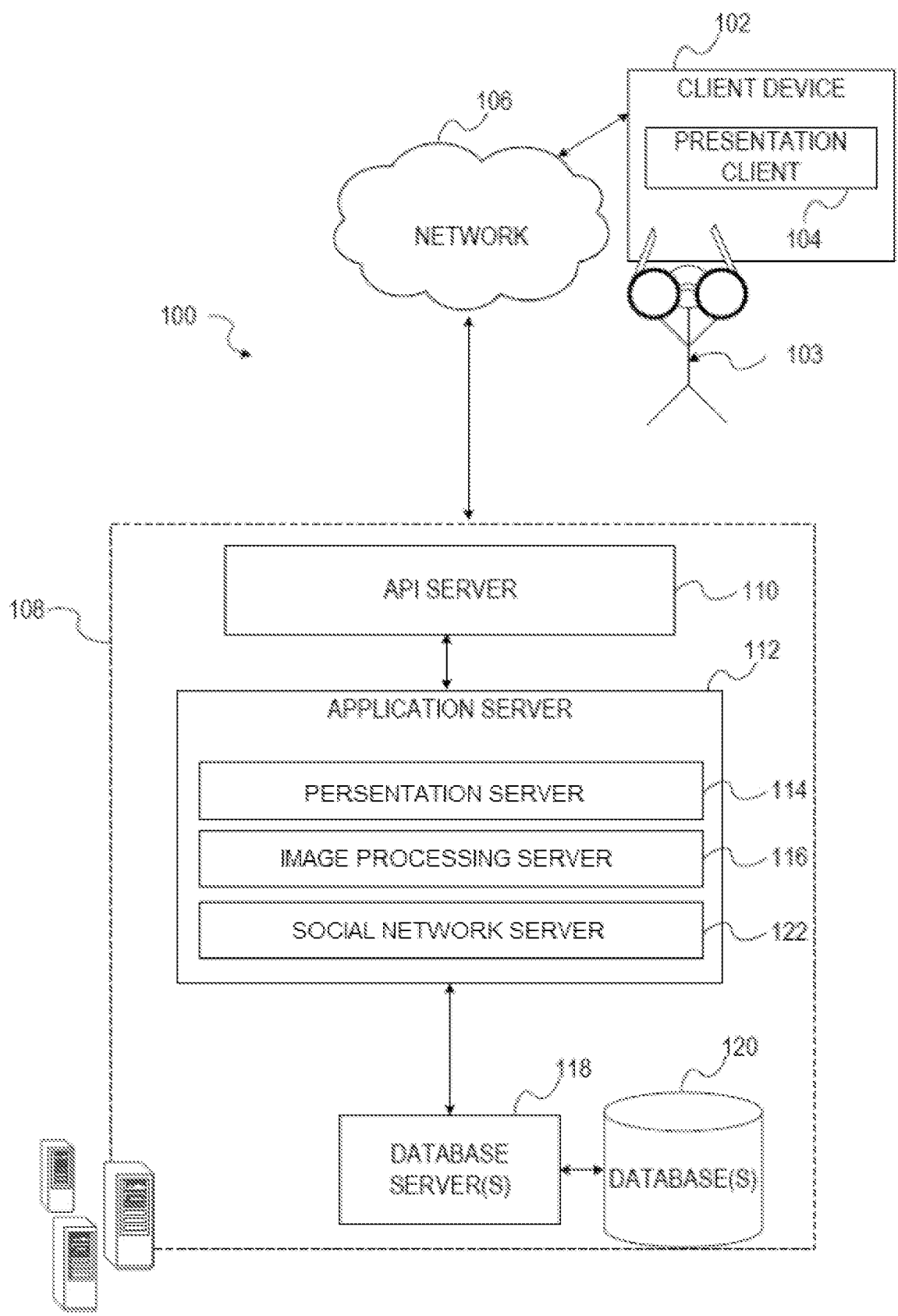
FIG. 1 is a diagrammatic representation of a networked environment in which a volumetric content presentation system may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Volumetric content is an example of an augmented reality (AR) experience. Volumetric content can include volumetric videos and images of three-dimensional spaces captured in three-dimensions (as well as audio signals recorded with volumetric videos and images). Recording of volumetric content includes volumetrically capturing elements of the three-dimensional space such as objects and human beings using a combination of cameras and sensors. Volumetric content includes a volumetric representation of one or more three-dimensional elements (e.g., an object or a person) of a three-dimensional space. A volumetric representation of an element (e.g., an AR content item) refers to a visual representation of the three-dimensional element in three-dimensions. The presentation of the volumetric content may include displaying one or more AR content items overlaid upon a real-world space, which may be the same as the three-dimensional space in which the volumetric video was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may include tracking a location and movement of a user within their physical real-world environment and using the tracked location and movement of the user to allow the user to move around in and interact with the presentation of the volumetric content. As such, the presentation of the volumetric content may include displaying a content item from multiple perspectives depending on a user's movement and change in location. In this manner, the presentation of volumetric content provides an immersive AR experience to users.

Conventional volumetric content systems lack mechanisms to support a fully immersive AR experience beyond merely displaying volumetric content. That is, conventional volumetric content systems typically only provide limited engagement with users' sense of sight and sound while failing to provide interactions with the users' other senses, thereby lowering the perception of realism that AR experiences intend to provide through presentation of volumetrically captured moments.

Aspects of the present disclosure include systems, methods, techniques, instruction sequences, and computing machine program products to provide a touch-based (e.g., haptic feedback-based) AR experience. The touch-based AR experience can be provided as part of or independently of the presentation of the volumetric content. The touch-based AR experience utilizes an object equipped with sensors to detect a grip of a first user and components (e.g., haptic components) capable of providing touch-based interactions with a second user. In some examples, the touch-based AR experience may correspond to a pre-recorded grip of the same or a similar object. Specifically, an intensity and a duration of the haptic feedback may correspond to an intensity and a duration of the grip. The presentation of the volumetric content may include a visual representation on one or more regions of the object corresponding to regions of the grip and/or a presentation of a volumetric representation of a person gripping the object.

In an example of the foregoing, a volumetric content presentation system registers a first user's touch on an object and allows a second user to experience a memory associated with the touch. The system may include a smart object such as a custom smart mug equipped with sensors for detecting touch and components for provided a touch-based interaction. During an initial capture phase, a first user holds the smart mug. The touch points and hand pressure of the first user are determined and stored by the system. Volumetric capture techniques may be used to generate a volumetric representation of the first user holding the smart mug. During a subsequent experience phase, a second user wearing smart glasses may look at the smart mug and see a visual representation (e.g., visualization of the fingerprints glowing) on the smart mug. When the second user touches the mug, the mug vibrates at an intensity that matches the intensity at which it was held by the first user. That is, the stronger the grip of the first user, the stronger the vibration provided by the second user. In this way, the volumetric content presentation system allows the second user to experience the feeling of touch even if the second user was not around the first user at the moment when the first user held the mug. The second user touching the mug may also trigger a presentation of the volumetric representation of the first user holding the mug. Additionally, the conversations by the first user may be captured and presented with the volumetric content. In this manner, the volumetric content presentation system allows users to not only visualize and sense touch, but also bring back memories associated with the object as if the events and the conversations were happening again.

FIG. 1 is a block diagram showing an example volumetric content presentation system 100 for presenting volumetric content. The volumetric content presentation system 100 includes of a client device 102. The client device 102 hosts a number of applications including a presentation client 104. Each presentation client 104 is communicatively coupled to a presentation server system 108 via a network 106 (e.g., the Internet). In an example, the client device 102 is a wearable device (e.g., smart glasses) worn by the user 103 that includes a camera and optical elements that include a transparent display through which the real-world environment is visible to the user 103.

A presentation client 104 is able to communicate and exchange data with another presentation client 104 and with the presentation server system 108 via the network 106. The data exchanged between the presentation client 104, and between another presentation client 104 and the presentation server system 108, includes functions (e.g., commands to invoke functions) as well as payload data (e.g., text, audio, video, or other multimedia data).

The presentation server system 108 provides server-side functionality via the network 106 to a particular presentation client 104. While certain functions of the volumetric content presentation system 100 are described herein as being performed by either a presentation client 104 or by the presentation server system 108, the location of certain functionality either within the presentation client 104 or the presentation server system 108 is a design choice. For example, it may be technically preferable to initially deploy certain technology and functionality within the presentation server system 108, but to later migrate this technology and functionality to the presentation client 104 where the client device (102) has a sufficient processing capacity.

The presentation server system 108 supports various services and operations that are provided to the presentation client 104. Such operations include transmitting data to, receiving data from, and processing data generated by the presentation client 104. This data may include volumetric content (e.g., volumetric videos), message content, device information, geolocation information, media annotation and overlays, message content persistence conditions, social network information, and live event information, as examples. Data exchanges within the volumetric content presentation system 100 are invoked and controlled through functions available via user interfaces (UIs) and of the presentation client 104.

Turning now specifically to the presentation server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the API server 110 provides a set of interfaces (e.g., routines and protocols) that can be called or queried by the presentation client 104 in order to invoke functionality of the application server 112. The API server 110 exposes various functions supported by the application server 112, including account registration, login functionality, the sending of messages, via the application server 112, from a particular presentation client 104 to another presentation client 104, the sending of media files (e.g., volumetric videos) to the presentation client 104, the setting of a collection of media data (e.g., story), the retrieval of a list of friends of a user of a client device 102, the retrieval of such collections, the retrieval of messages and content, the adding and deletion of friends to a social graph, the location of friends within a social graph, and opening an application event (e.g., relating to the presentation client 104).

The application server 112 hosts a number of applications and subsystems, including a presentation server 114, an image processing server 116 and a social network server 122. The presentation server 114 is generally responsible for managing volumetric content and facilitating presentation thereof by the client device 102. The image processing server 116 is dedicated to performing various image processing operations, typically with respect to images or video generated and displayed by the client device 102. The presentation server 114 and image processing server 116 may work in conjunction to provide one or more AR experiences to the user 103. For example, the presentation server 114 and image processing server 116 may work in conjunction to support presentation of volumetric content by the client device 102. Further details regarding presentation of volumetric content are discussed below.

The social network server 122 supports various social networking functions and services, and makes these functions and services available to the presentation server 114. To this end, the social network server 122 maintains and accesses an entity graph within the database 120. Examples of functions and services supported by the social network server 122 include the identification of other users of the volumetric content presentation system 100 with which a particular user has relationships or is "following", and also the identification of other entities and interests of a particular user.

The application server 112 is communicatively coupled to a database server 118, which facilitates access to a database 120 in which is stored data associated with content presented by the presentation server 114 and image processing server 116.

Figure 2A:
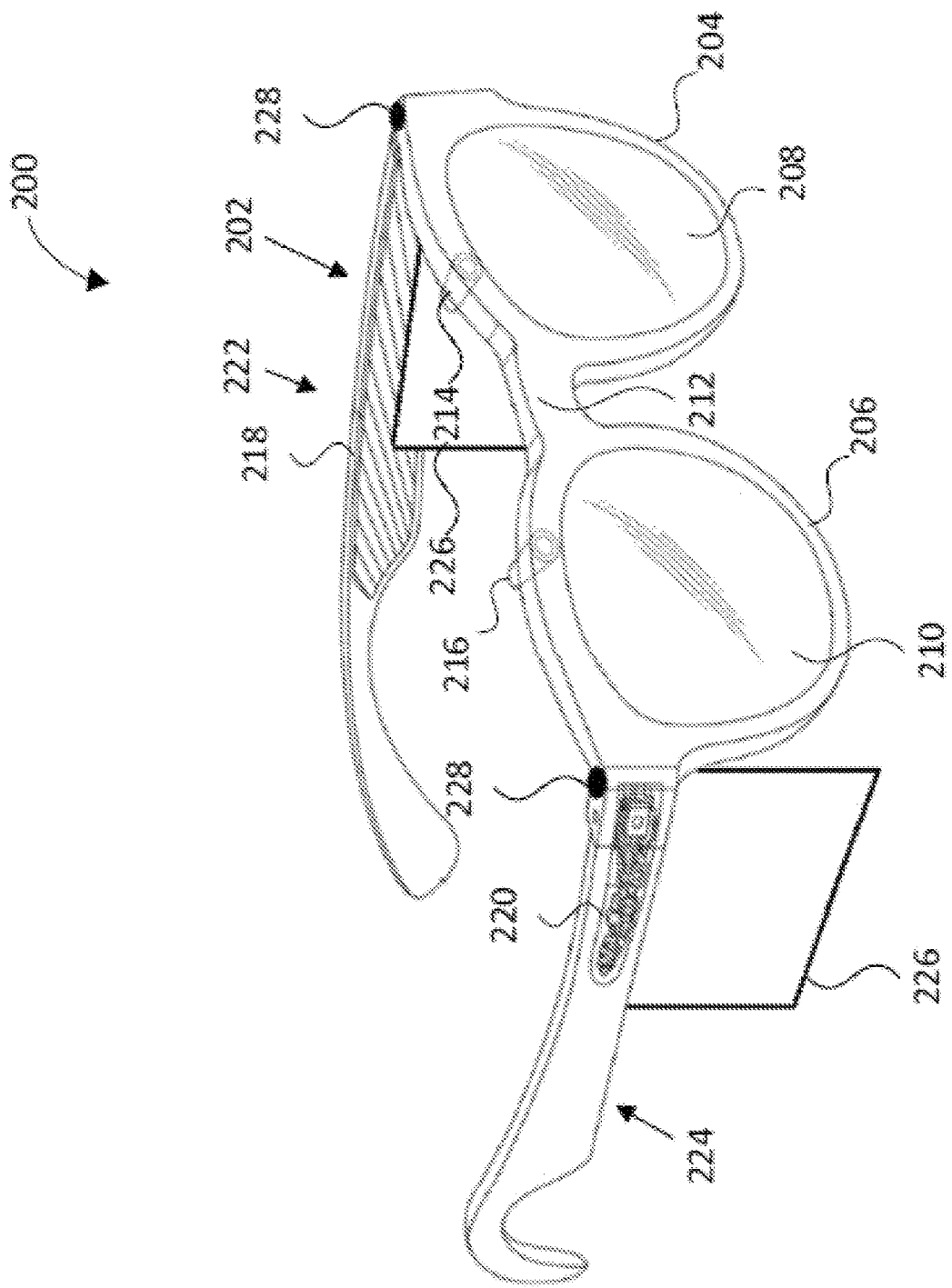
FIG. 2A is a perspective view of a head-worn device, in accordance with some example embodiments.

FIG. 2A is perspective view of a head-worn display device (e.g., glasses 200), in accordance with some examples. The glasses 200 are an example of the client device 102 of FIG. 1. The glasses 200 are capable of displaying content and are thus an example of a display device, which is referenced below. In addition, the display capabilities of the glasses 200 support AR experiences and the glasses 200 are thus an example of an AR device. As noted above, AR experiences include application of virtual content to real-world environments whether through presentation of the virtual content by transparent displays through which a real-world environment is visible or through augmenting image data to include the virtual content overlaid on real-world environments depicted therein.

The glasses 200 can include a frame 202 made from any suitable material such as plastic or metal, including any suitable shape memory alloy. In one or more examples, the frame 202 includes a first or left optical element holder 204 (e.g., a display or lens holder) and a second or right optical element holder 206 connected by a bridge 212. A first or left optical element 208 and a second or right optical element 210 can be provided within respective left optical element holder 204 and right optical element holder 206. The right optical element 210 and the left optical element 208 can be a lens, a display, a display assembly, or a combination of the foregoing. Any suitable display assembly can be provided in the glasses 200.

The frame 202 additionally includes a left arm or temple piece 222 and a right arm or temple piece 224. In some examples the frame 202 can be formed from a single piece of material so as to have a unitary or integral construction.

The glasses 200 can include a computing device, such as a computer 220, which can be of any suitable type so as to be carried by the frame 202 and, in one or more examples, of a suitable size and shape, so as to be partially disposed in one of the temple piece 222 or the temple piece 224. The computer 220 can include one or more processors with memory, wireless communication circuitry, and a power source. As discussed below, the computer 220 comprises low-power circuitry, high-speed circuitry, and a display processor. Various other examples may include these elements in different configurations or integrated together in different ways. Additional details of aspects of computer 220 may be implemented as illustrated by the data processor 302 discussed below.

The computer 220 additionally includes a battery 218 or other suitable portable power supply. In some examples, the battery 218 is disposed in left temple piece 222 and is electrically coupled to the computer 220 disposed in the right temple piece 224. The glasses 200 can include a connector or port (not shown) suitable for charging the battery 218, a wireless receiver, transmitter or transceiver (not shown), or a combination of such devices.

The glasses 200 include a first or left camera 214 and a second or right camera 216. Although two cameras are depicted, other examples contemplate the use of a single or additional (i.e., more than two) cameras. In one or more examples, the glasses 200 include any number of input sensors or other input/output devices in addition to the left camera 214 and the right camera 216. Such sensors or input/output devices can additionally include biometric sensors, location sensors, motion sensors, and so forth.

In some examples, the left camera 214 and the right camera 216 provide video frame data for use by the glasses 200 to extract 3D information from a real-world scene.

The glasses 200 may also include a touchpad 226 mounted to or integrated with one or both of the left temple piece 222 and right temple piece 224. The touchpad 226 is generally vertically-arranged, approximately parallel to a user's temple in some examples. As used herein, generally vertically aligned means that the touchpad is more vertical than horizontal, although potentially more vertical than that. Additional user input may be provided by one or more buttons 228, which in the illustrated examples are provided on the outer upper edges of the left optical element holder 204 and right optical element holder 206. The one or more touchpads 226 and buttons 228 provide a means whereby the glasses 200 can receive input from a user of the glasses 200.

Figure 2B:
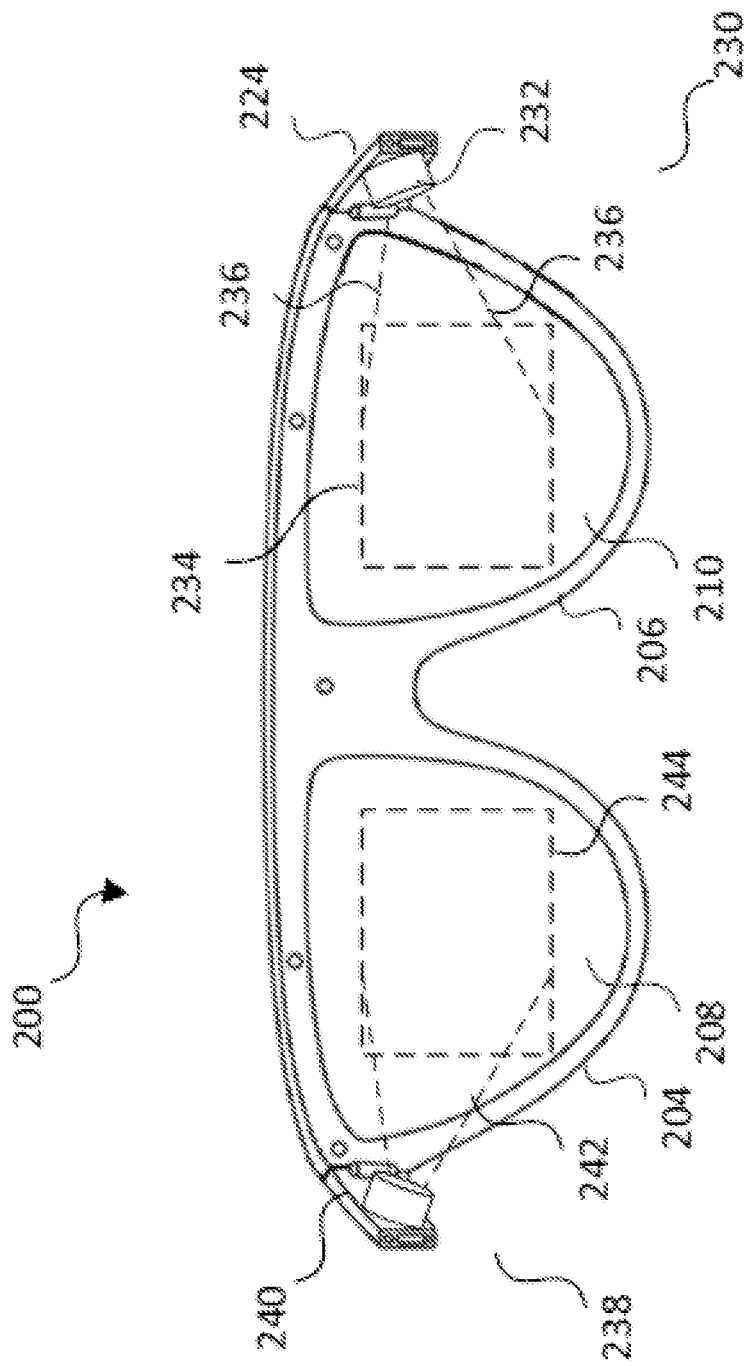
FIG. 2B illustrates a further view of the head-worn device of FIG. 2A, in accordance with some example embodiments.

FIG. 2B illustrates the glasses 200 from the perspective of a user. For clarity, a number of the elements shown in FIG. 2A have been omitted. As described in FIG. 2A, the glasses 200 shown in FIG. 2B include left optical element 208 and right optical element 210 secured within the left optical element holder 204 and the right optical element holder 206 respectively.

The glasses 200 include forward optical assembly 230 comprising a right projector 232 and a right near eye display 234, and a forward optical assembly 238 including a left projector 240 and a left near eye display 244.

In some examples, the near eye displays are waveguides. The waveguides include reflective or diffractive structures (e.g., gratings and/or optical elements such as mirrors, lenses, or prisms). Light 236 emitted by the projector 232 encounters the diffractive structures of the waveguide of the near eye display 234, which directs the light towards the right eye of a user to provide an image on or in the right optical element 210 that overlays the view of the real world seen by the user. Similarly, light 242 emitted by the projector 240 encounters the diffractive structures of the waveguide of the near eye display 244, which directs the light towards the left eye of a user to provide an image on or in the left optical element 208 that overlays the view of the real world seen by the user. The combination of a GPU, the forward optical assembly 230, the left optical element 208, and the right optical element 210 provide an optical engine of the glasses 200. The glasses 200 use the optical engine to generate an overlay of the real world view of the user including display of a 3D user interface to the user of the glasses 200.

It will be appreciated however that other display technologies or configurations may be utilized within an optical engine to display an image to a user in the user's field of view. For example, instead of a projector 232 and a waveguide, an LCD, LED or other display panel or surface may be provided.

In use, a user of the glasses 200 will be presented with information, content, and various 3D user interfaces on the near eye displays. As described in more detail herein, the user can then interact with the glasses 200 using a touchpad 226 and/or the buttons 228, voice inputs or touch inputs on an associated device (e.g., client device 328 illustrated in FIG. 3), and/or hand movements, locations, and positions detected by the glasses 200.

Figure 3:
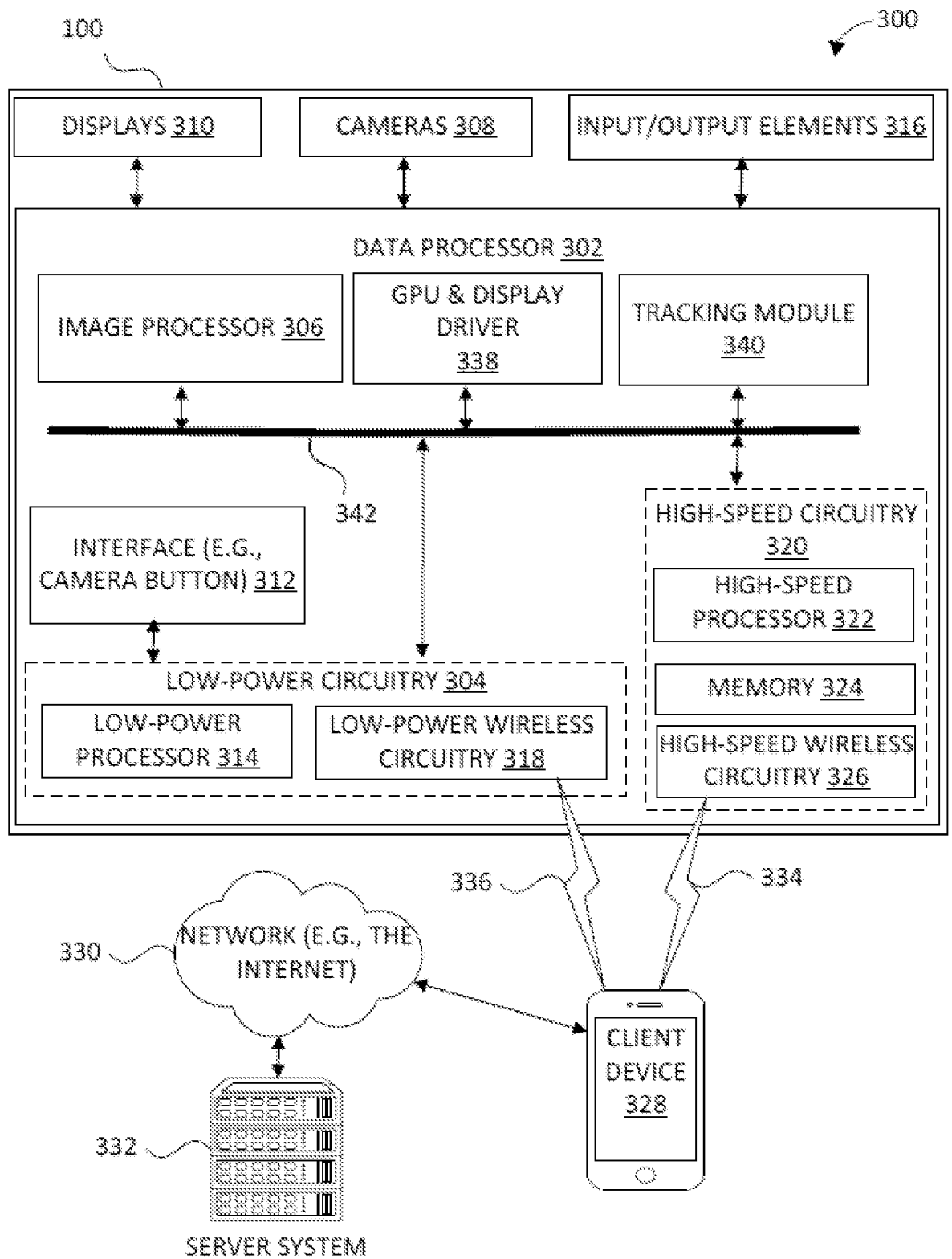
FIG. 3 is a block diagram illustrating a networked system including details of the head-worn device of FIG. 1, in accordance with some example embodiments.

FIG. 3 is a block diagram illustrating a networked system 300 including details of the glasses 200, in accordance with some examples. The networked system 300 includes the glasses 200, a client device 328, and a server system 332.

The client device 328 may be a smartphone, tablet, phablet, laptop computer, access point, or any other such device capable of connecting with the glasses 200 using a low-power wireless connection 336 and/or a high-speed wireless connection 334. The client device 328 is connected to the server system 332 via the network 330. The network 330 may include any combination of wired and wireless connections. The server system 332 may be one or more computing devices as part of a service or network computing system. The client device 328 and any elements of the server system 332 and network 330 may be implemented using details of the software architecture 1406 or the machine 1500 described in FIG. 14 and FIG. 15 respectively.

The glasses 200 include a data processor 302, displays 310, one or more cameras 308, and additional input/output elements 316. The input/output elements 316 may include microphones, audio speakers, biometric sensors, additional sensors, or additional display elements integrated with the data processor 302. Examples of the input/output elements 316 are discussed further with respect to FIG. 14 and FIG. 15. For example, the input/output elements 316 may include any of I/O components 1518 including output components 1526, motion components 1534, and so forth. Examples of the displays 310 are discussed in FIG. 2B. In the particular examples described herein, the displays 310 include a display for the user's left and right eyes.

The data processor 302 includes an image processor 306 (e.g., a video processor), a GPU & display driver 338, a tracking module 340, an interface 312, low-power circuitry 304, and high-speed circuitry 320. The components of the data processor 302 are interconnected by a bus 342.

The interface 312 refers to any source of a user command that is provided to the data processor 302. In one or more examples, the interface 312 is a physical button that, when depressed, sends a user input signal from the interface 312 to a low-power processor 314. A depression of such button followed by an immediate release may be processed by the low-power processor 314 as a request to capture a single image, or vice versa. A depression of such a button for a first period of time may be processed by the low-power processor 314 as a request to capture video data while the button is depressed, and to cease video capture when the button is released, with the video captured while the button was depressed stored as a single video file. Alternatively, depression of a button for an extended period of time may capture a still image. In some examples, the interface 312 may be any mechanical switch or physical interface capable of accepting user inputs associated with a request for data from the cameras 308. In other examples, the interface 312 may have a software component, or may be associated with a command received wirelessly from another source, such as from the client device 328.

The image processor 306 includes circuitry to receive signals from the cameras 308 and process those signals from the cameras 308 into a format suitable for storage in the memory 324 or for transmission to the client device 328. In one or more examples, the image processor 306 (e.g., video processor) comprises a microprocessor integrated circuit (IC) customized for processing sensor data from the cameras 308, along with volatile memory used by the microprocessor in operation.

The low-power circuitry 304 includes the low-power processor 314 and the low-power wireless circuitry 318. These elements of the low-power circuitry 304 may be implemented as separate elements or may be implemented on a single IC as part of a system on a single chip. The low-power processor 314 includes logic for managing the other elements of the glasses 200. As described above, for example, the low-power processor 314 may accept user input signals from the interface 312. The low-power processor 314 may also be configured to receive input signals or instruction communications from the client device 328 via the low-power wireless connection 336. The low-power wireless circuitry 318 includes circuit elements for implementing a low-power wireless communication system. Bluetooth™ Smart, also known as Bluetooth™ low energy, is one standard implementation of a low power wireless communication system that may be used to implement the low-power wireless circuitry 318. In other examples, other low power communication systems may be used.

The high-speed circuitry 320 includes a high-speed processor 322, a memory 324, and a high-speed wireless circuitry 326. The high-speed processor 322 may be any processor capable of managing high-speed communications and operation of any general computing system used for the data processor 302. The high-speed processor 322 includes processing resources used for managing high-speed data transfers on the high-speed wireless connection 334 using the high-speed wireless circuitry 326. In some examples, the high-speed processor 322 executes an operating system such as a LINUX operating system or other such operating system. In addition to any other responsibilities, the high-speed processor 322 executing a software architecture for the data processor 302 is used to manage data transfers with the high-speed wireless circuitry 326. In some examples, the high-speed wireless circuitry 326 is configured to implement Institute of Electrical and Electronic Engineers (IEEE) 802.11 communication standards, also referred to herein as Wi-Fi. In other examples, other high-speed communications standards may be implemented by the high-speed wireless circuitry 326.

The memory 324 includes any storage device capable of storing camera data generated by the cameras 308 and the image processor 306. While the memory 324 is shown as integrated with the high-speed circuitry 320, in other examples, the memory 324 may be an independent stand-alone element of the data processor 302. In some such examples, electrical routing lines may provide a connection through a chip that includes the high-speed processor 322 from image processor 306 or the low-power processor 314 to the memory 324. In other examples, the high-speed processor 322 may manage addressing of the memory 324 such that the low-power processor 314 will boot the high-speed processor 322 any time that a read or write operation involving the memory 324 is desired.

The tracking module 340 estimates a pose of the glasses 200. For example, the tracking module 340 uses image data and corresponding inertial data from the cameras 308 and the position components 1538, as well as GPS data, to track a location and determine a pose of the glasses 200 relative to a frame of reference (e.g., real-world environment). The tracking module 340 continually gathers and uses updated sensor data describing movements of the glasses 200 to determine updated three-dimensional poses of the glasses 200 that indicate changes in the relative position and orientation relative to physical objects in the real-world environment. The tracking module 340 permits visual placement of virtual objects relative to physical objects by the glasses 200 within the field of view of the user via the displays 310.

The GPU & display driver 338 may use the pose of the glasses 200 to generate frames of virtual content or other content to be presented on the displays 310 when the glasses 200 are functioning in a traditional augmented reality mode. In this mode, the GPU & display driver 338 generates updated frames of virtual content based on updated three-dimensional poses of the glasses 200, which reflect changes in the position and orientation of the user in relation to physical objects in the user's real-world environment.

One or more functions or operations described herein may also be performed in an application resident on the glasses 200 or on the client device 328, or on a remote server. The glasses 200 may be a stand-alone client device that is capable of independent operation or may be a companion device that works with a primary device to offload intensive processing and/or exchange data over the network 106 with the presentation server system 108. The glasses 200 may also be communicatively coupled with a companion device such as a smart watch and may be configured to exchange data with the companion device. The glasses 200 may further include various components common to mobile electronic devices such as smart glasses or smart phones (for example, including a display controller for controlling display of visual media on a display mechanism incorporated in the device).

Figure 4:
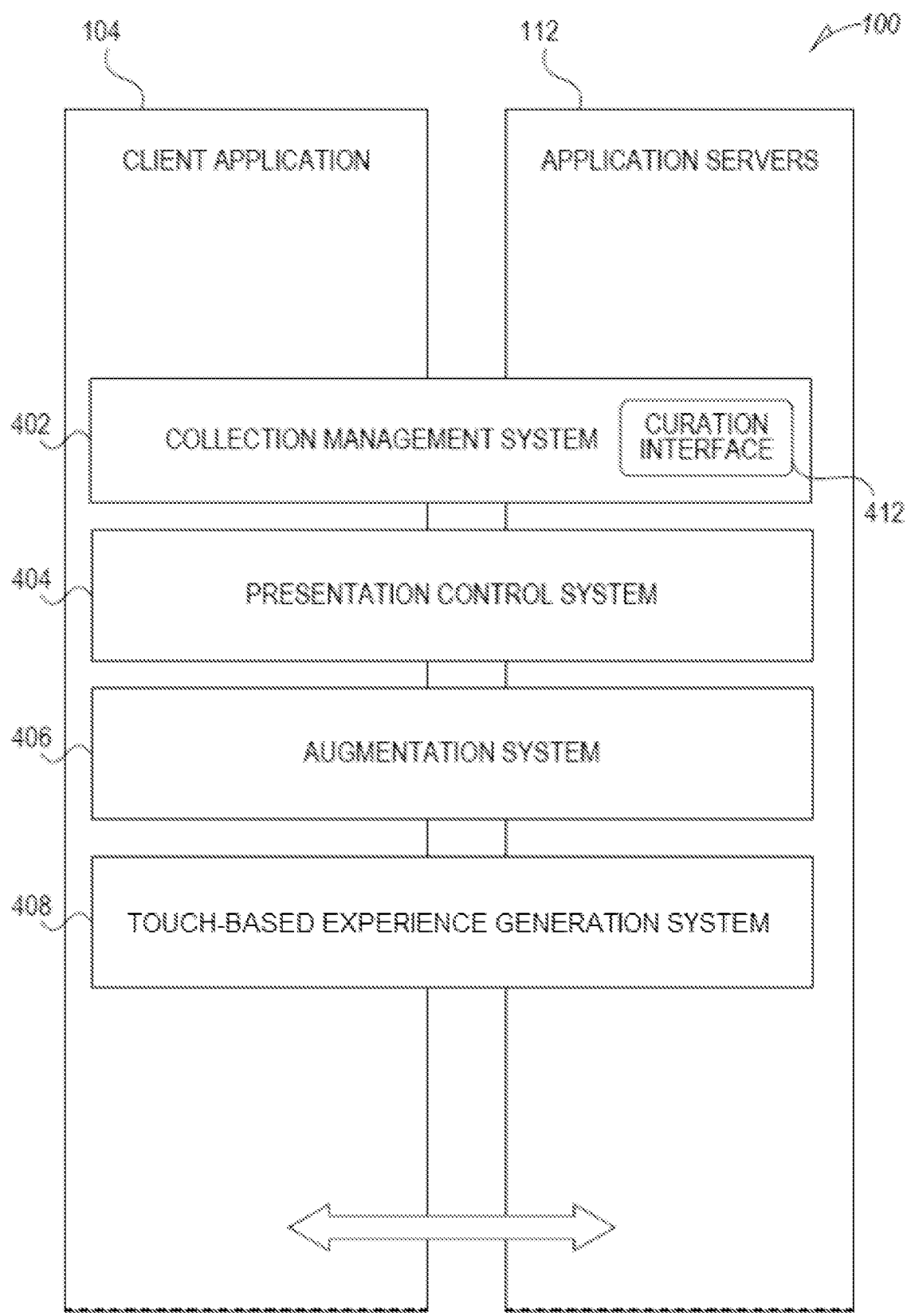
FIG. 4 is a diagrammatic representation of the volumetric content presentation system, in accordance with some example embodiments, that has both client-side and server-side functionality.

FIG. 4 is a block diagram illustrating further details regarding the volumetric content presentation system 100, according to some examples. Specifically, the volumetric content presentation system 100 is shown to comprise the presentation client 104 and the application servers 112. The volumetric content presentation system 100 embodies a number of subsystems, which are supported on the client-side by the presentation client 104 and on the sever-side by the application servers 112. These subsystems include, for example, a collection management system 402, a presentation control system 404, an augmentation system 406, and a touch-based experience generation system 408.

The collection management system 402 is responsible for managing sets or collections of content (e.g., collections of text, image, video, and audio data). A collection of content may be organized into an "event gallery" or an "event story." Such a collection may be made available for a specified time period, such as the duration of an event to which the content relates. For example, content relating to a music concert may be made available as a "story" for the duration of that music concert. The collection management system 402 may also be responsible for publishing an icon that provides notification of the existence of a particular collection to the user interface of the presentation client 104.

The collection management system 402 furthermore includes a curation interface 412 that allows a collection manager to manage and curate a particular collection of content. For example, the curation interface 412 enables an event organizer to curate a collection of content relating to a specific event (e.g., delete inappropriate content or redundant messages). Additionally, the collection management system 402 employs machine vision (or image recognition technology) and content rules to automatically curate a content collection.

The presentation control system 404 is responsible for facilitating and controlling volumetric content presentation. As such, the presentation control system 404 provides a mechanism that allows users to specify control operations for controlling volumetric content presentation. Control operations may, for example, include: a stop operation to stop the presentation; a pause operation to pause the presentation; a fast-forward operation to advance the presentation at a higher speed; a rewind operation to rewind the presentation; a zoom-in operation to increase a zoom level of the presentation; a zoom-out operation to decrease the zoom level of the presentation; and a playback speed modification operation to change the speed of the presentation (e.g., to produce a slow-motion presentation of the volumetric video).

For some embodiments, a user may specify input indicative of a control operation for controlling presentation of volumetric content by providing one or more inputs via one or more I/O components (examples of which are described in further detail below in reference to FIG. 15). For some embodiments, the presentation control system 404 may provide an interactive control interface comprising one or more interactive elements (e.g., virtual buttons) to trigger a control operation and the presentation control system 404 monitors interaction with the interactive interface to detect input indicative of a control operation. For some embodiments, a user may trigger a control operation using a gesture such as a hand or head gesture that can be associated with a specific control operation.

The augmentation system 406 provides various functions that enable a user to augment (e.g., annotate or otherwise modify or edit) media content. For example, the augmentation system 406 provides functions related to the generation, publication, and application of augmentation data such as media overlays (e.g., image filters) to volumetric content. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. The augmentation system 406 operatively supplies one or more media overlays to the presentation client 104 based on a geolocation of the client device 102 or based on other information, such as social network information of the user of the client device 102. The media overlays may be stored in the database 120 and accessed through the database server 118.

Filters are an example of media overlays that are displayed as overlaid on an image or video during presentation to a user. Filters may be of various types, including user-selected filters from a set of filters presented to a user by the presentation client 104. Other types of filters include geolocation filters (also known as geo-filters), which may be presented to a user based on geographic location. For example, geolocation filters specific to a neighborhood or special location may be presented within a user interface by the presentation client 104, based on geolocation information determined by a Global Positioning System (GPS) unit of the client device 102.

Another type of filter is a data filter, which may be selectively presented to a user by the presentation client 104, based on other inputs or information gathered by the client device 102. Examples of data filters include current temperature at a specific location, a current speed at which a sending user is traveling, battery life for a client device 102, or the current time.

AR content items are another example of media overlays. An AR content item may be a real-time special effect and/or sound that can be added to an image or a video including volumetric images and videos.

Generally, AR content items, overlays, image transformations, images, and similar terms refer to modifications that may be applied to image data (e.g., videos or images) including volumetric content. This includes real-time modifications, which modify an image as it is captured using device sensors (e.g., one or multiple cameras) of a client device 102 and then displayed by a display device of the client device 102 (e.g., an embedded display of the client device) with the modifications. This also includes modifications to stored content, such as volumetric videos in a gallery or collection that may be modified. For example, in a client device 102 with access to multiple AR content items, a user can use a single volumetric video with multiple AR content items to see how the different AR content items will modify the stored content. For example, multiple augmented reality content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such augmentation systems to modify content using augmentation data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, volumetric videos, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be augmented (e.g., edited), elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh can be used in the following stage of tracking the elements of the object in the video stream. In the process of tracking, the mentioned mesh for each element is aligned with a position of each element. Then, additional points are generated on the mesh. A set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

The augmentation system 406 can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform video and image content can be used by the augmentation system 406 where a neural network operates as part of a presentation client 104 operating on the client device 102. The augmentation system 406 determines the presence of a face within the image or video stream and provides interactive modification elements (e.g., icons) associated with a computer animation model to transform image data, or the computer animation model can be present as associated with an interface described herein. The interactive modification elements include changes that may be the basis for modifying the user's face within the image or video content as part of the modification operation. Once a modification icon is selected, the transform system initiates a process to convert the image of the user to reflect the selected modification icon (e.g., generate a smiling face on the user). Modified image or video content may be presented in a graphical user interface displayed on the client device 102 as soon as the image or video stream is captured, and a specified modification is selected. The augmentation system 406 may implement a complex convolutional neural network on a portion of the image or video content to generate and apply the selected modification. That is, the user may be presented with modified content in real-time or near real-time. Further, the modification may be persistent while the content is being presented. Machine taught neural networks may be used to enable such modifications.

The touch-based experience generation system 408 is responsible for providing a touch-based experience to a user. In some examples, the touch-based experience generation system 408 may access data related to a grip of the object. The data may include a first region of the grip of the object. The data may also include an intensity of force applied on the object in the grip and/or a duration of the grip. In some examples, the touch-based experience generation system 408 may cause a display device (e.g., glasses 200) to display a visual representation on the first region. The touch-based experience generation system 408 may detect a touch of a user on a second region of the object. The second region may at least partially overlap with the first region. In response to the detection, the touch-based experience generation system 408 may generate haptic feedback (e.g., a vibration) to the user. The intensity of the haptic feedback may correspond to the intensity of the force applied on the object in the grip. The duration of the haptic feedback may correspond to the duration of the grip. If the data include a volumetric representation of a user gripping the object, the touch-based experience generation system 408 may display the volumetric representation concurrently with or independently of the haptic feedback. If the data include an audio signal recorded during the grip of the object, the touch-based experience generation system 408 may also cause an audio device to present the audio signal, concurrently with or independently of the volumetric representation and/or the haptic feedback.

Figure 5:
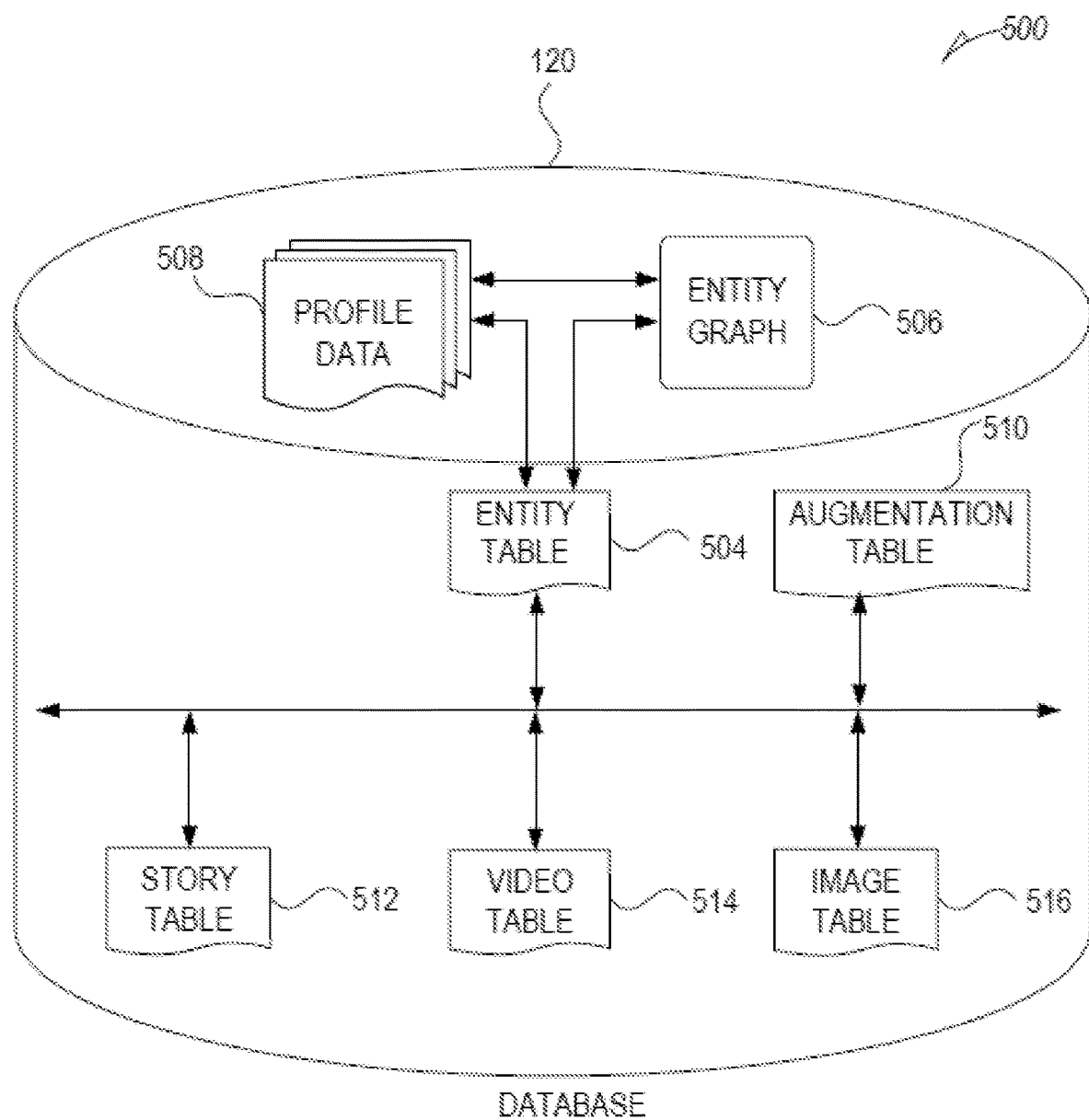
FIG. 5 is a diagrammatic representation of a data structure as maintained in a database, in accordance with some example embodiments.

FIG. 5 is a diagrammatic representation of a data structure 500 as maintained in the database 120, in accordance with some examples. While the content of the database 120 is shown to comprise a number of tables, it will be appreciated that the data could be stored in other types of data structures (e.g., as an object-oriented database).

An entity table 504 stores entity data, and is linked (e.g., referentially) to an entity graph 506 and profile data 508. Entities for which records are maintained within the entity table 504 may include individuals, corporate entities, organizations, objects, places, events, and so forth. Regardless of entity type, any entity regarding which the presentation server system 108 stores data may be a recognized entity. Each entity is provided with a unique identifier, as well as an entity type identifier (not shown). The entity table 504 may associate various augmentations from the augmentation table 510 with various images and videos stored in the image table 516 and the video table 514.

The entity graph 506 stores information regarding relationships and associations between entities. Such relationships may be social, professional (e.g., work at a common corporation or organization) interested-based or activity-based, merely for example.

The profile data 508 stores multiple types of profile data about a particular entity. The profile data 508 may be selectively used and presented to other users of the volumetric content presentation system 100, based on privacy settings specified by a particular entity. Where the entity is an individual, the profile data 508 includes, for example, a user name, telephone number, address, settings (e.g., notification and privacy settings), as well as a user-selected avatar representation (or collection of such avatar representations).

The database 120 also stores augmentation data, such as overlays including AR content items and filters, in an augmentation table 510. The augmentation data is associated with and applied to videos (for which data is stored in a video table 514) and images (for which data is stored in an image table 516) including volumetric videos and images.

A story table 512 stores data regarding collections of content including associated image, video, or audio data that are compiled into a collection (e.g., a story or a gallery). The creation of a particular collection may be initiated by a particular user (e.g., each user for which a record is maintained in the entity table 504). A user may create a "personal story" in the form of a collection of content that has been created and sent/broadcast by that user. To this end, the user interface of the presentation client 104 may include an icon that is user-selectable to enable a sending user to add specific content to his or her personal story.

As mentioned above, the video table 514 stores video data that includes volumetric videos. Similarly, the image table 516 stores image data that that includes volumetric images.

Figure 6:
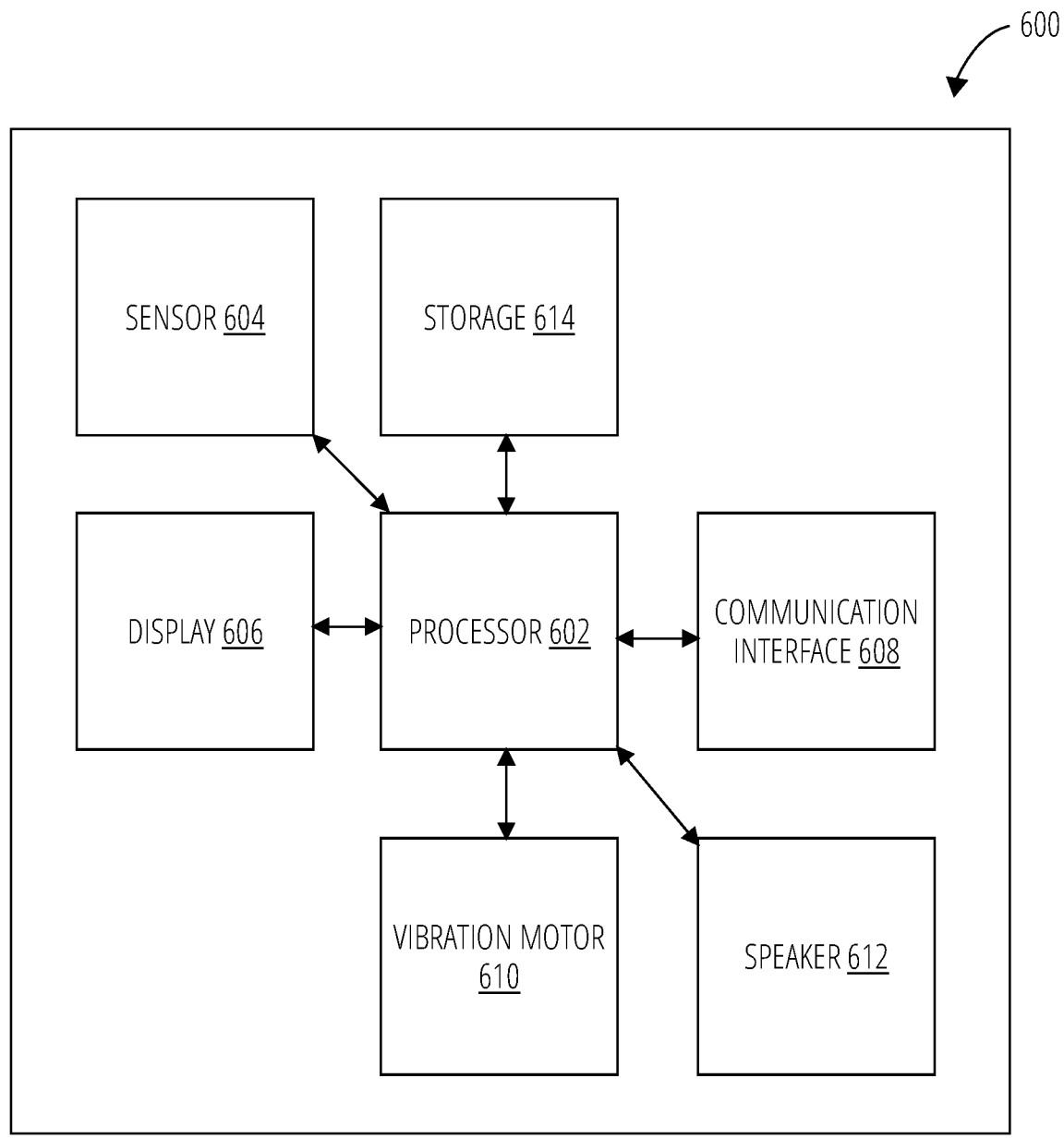
FIG. 6 is a block diagram illustrating a hardware system of a smart object, in accordance with some example embodiments.

FIG. 6 is a block diagram illustrating a hardware system of a smart object 600, in accordance with some example embodiments. The smart object 600 may include a processor 602, one or more sensor(s) 604, a display 606, a communication interface 608, a vibration motor, a speaker 612, and/or a storage 614.

The one or more sensor(s) 604 may generate sensor data related to a grip of the smart object 600 by a first user. The one or more sensor(s) 604 may include a pressure sensor or a haptic sensor that detect a location and an intensity of the grip. Sensor data related to the detected grip may be transmitted to the processor 602, or stored in the storage 614. The sensor data may specify an intensity of the grip (e.g., as a measure of pressure or force applied to the object), a duration of the grip, and a location of the grip on the object. For example, the sensor data may identify a first region on the object on which the grip occurred. For some embodiments, the smart object 600 (e.g., the processor 602) may determine the grip occurred on the first region of the object based on the sensor data. In some embodiments, the data related to the grip may be pre-stored in the storage 614. The processor 602 may access the pre-stored data from the storage 614.

The one or more sensor(s) 604 may also generate sensor data related to a touch on the smart object 600 by a second user. The smart object 600 (e.g., the processor 602) may monitor the sensor data generated by the one or more sensor(s) 604 to detect the touch by the second user. For some embodiments, the sensor data may include a measure of pressure applied to at least a region of the object and detecting the touch may comprise detecting satisfaction of a threshold condition based on the measure of pressure indicated by the sensor data. For example, the smart object 600 (e.g., the processor 602) may determine a second user is touching the object based on the measure of pressure indicated by the sensor data exceeding a threshold measure of pressure.

For some embodiments, the one or more sensor(s) 604 includes one or more biometric sensors or other sensors capable of providing data to identify the second user. The smart object 600 (e.g., the processor 602) may identify that the second user is touching the object from or based on the data from such sensors. For example, the smart object 600 may provide biometric data to the volumetric content presentation system 100 and the volumetric content presentation system 100 may match the biometric data with stored biometric data associated with a user profile to identify the second user.

For some embodiments, the one or more sensor(s) 604 may detect the second user touching a second region of the object. Consistent with these embodiments, the detecting the touch by the second user further includes determining the second region at least partially overlap with the first region. For some embodiments, an overlap constraint that defines a threshold overlap may be predefined and the smart object 600 (e.g., the processor 602) may determine whether an amount of overlap between the first region and the second region satisfies the overlap constraint as part of detecting the touch by the second user.

The display 606 may generate a presentation of a visual representation (e.g., a fingerprint-like representation) of the grip of the first user on the surface of the smart object 600. The visual representation of the grip may be displayed on the first region where the grip occurred so as to provide an indication to the second user where the grip of the first user occurred. In some embodiments, the display 606 may be omitted and the visual representation of the grip is displayed by a display device (e.g., glasses 200) worn by a user using an AR technology.

The communication interface 608 may transmit and/or receive data. For example, the communication interface 608 may transmit sensor data related to the grip of the smart object 600 by the first user to a display device (e.g., glasses 200). The sensor data related to the grip may include location of a first region of the grip and the display device may present a visual representation (e.g., a fingerprint-like representation) of the grip overlaid on the smart object 600 using an AR technology. The visual representation of the grip may be displayed on the first region where the grip occurred so as to provide an indication to the second user where the grip of the first user occurred. For some embodiments, the communication interface 608 may receive control instructions from the volumetric content presentation system 100. The communication interface 608 may transmit the control instructions to other components of the smart object 600. For example, the communication interface 608 may transmit control instructions related to providing a haptic feedback to the vibration motor 610 and cause the vibration motor 610 to provide a haptic feedback to a second user. The haptic feedback may be provided with an intensity and/or duration based on the intensity and/or duration of the grip of the first user. As another example, the communication interface 608 may transmit control instructions related to generating a sound signal to the speaker 612. The sound signal may be recorded during the grip of the object by the first user by a recorder (not shown in the figure). The speaker 612 may present the audio signal as part of providing an interaction with the second user. The speaker 612 may be embedded in the smart object 600 or may be a distinct audio device that is communicatively coupled to the smart object 600.

The storage 614 may store data related to the grip of the object by the first user. The data may specify an intensity of the grip (e.g., as a measure of pressure or force applied to the object), a duration of the grip, and a location of the grip on the object. For example, the data may identify a first region on the object on which the grip occurred. The data may further include volumetric representations of one or more elements of a real-world environment in which the grip by the first user was performed. For example, the volumetric content may include a volumetric video of the first user gripping the smart object 600.

Figure 7B:
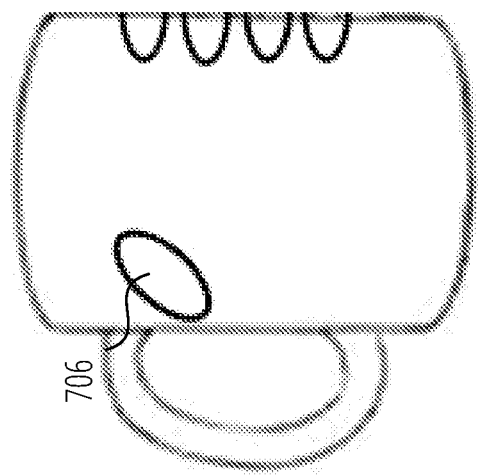
FIGS. 7A-7B are conceptual diagrams illustrating an example grip of the smart object, in accordance with some example embodiments.
Figure 7A:
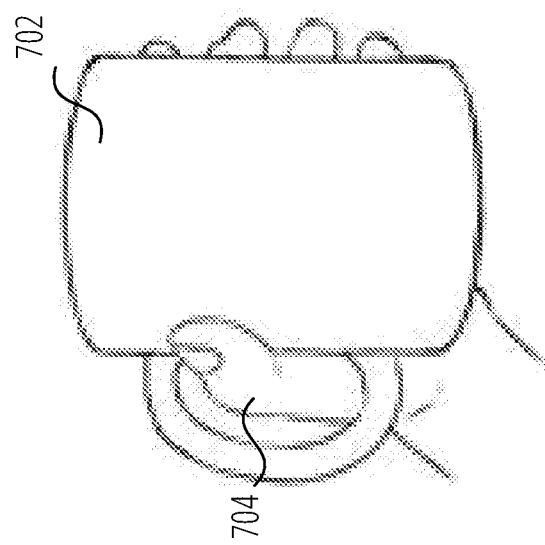

FIGS. 7A-7B are conceptual diagrams illustrating an example grip of the smart object 702, in accordance with some example embodiments. The smart object 702 is an example of the smart object 600. As shown in the FIGS. 7A-7B, a first user may grip the smart object 702 with one of their hands. The grip on the smart object 702 by the fingers 704 may be detected by one or more sensors of the smart object 702 (e.g., one or more sensors 604) on one or more first regions 706 of the smart object 702.

Figure 8B:
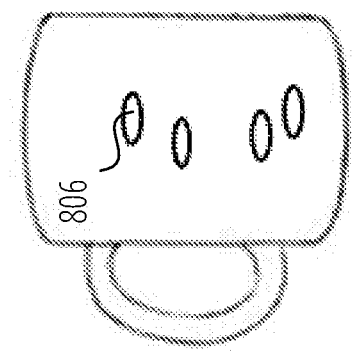
FIGS. 8A-8B are conceptual diagrams illustrating an example touch of the smart object, in accordance with some example embodiments.
Figure 8A:
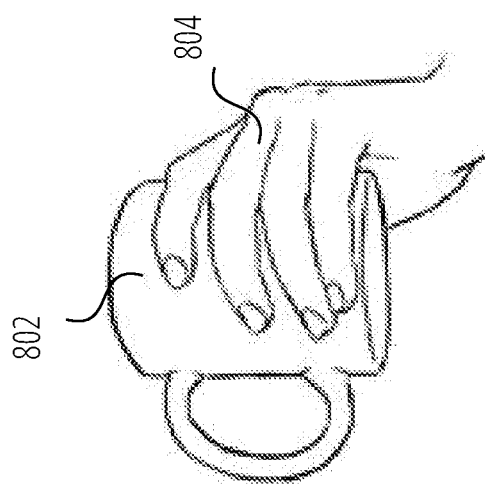

FIGS. 8A-8B are conceptual diagrams illustrating an example touch of a smart object 802, in accordance with some example embodiments. The smart object 802 is an example of the smart object 600. As shown in the FIGS. 8A-8B, a second user may touch the smart object 802 with one of their hands. The smart object 802 may be the same or different from the smart object 702. In instances in which the smart object 702 is different from the smart object 802, the smart object 802 may communicate with the smart object 702 to obtain data related to the grip of the smart object 702 or the smart object 802 access the data from a data storage component (e.g., an internal data storage component of the smart object 802 or a network-accessible data storage component). The fingers 804 of the second user may touch the smart object 802 on one or more second regions 806. The volumetric content presentation system 100 may determine that the one or more second regions 806 do not at least partially overlap with the one or more first regions 706 and as a result, the smart object 802 may not provide any sort of interaction with the second user.

Figure 9B:
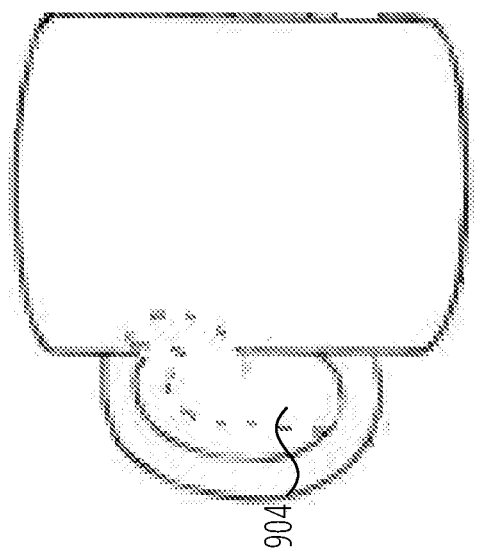
FIG. 9B is a conceptual diagram illustrating an example presentation of a volumetric representation of gripping the object overlaid on the smart object, in accordance with some example embodiments.
Figure 9A:
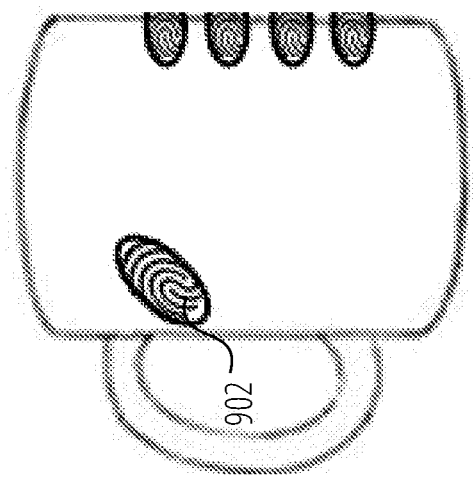
FIG. 9A is a conceptual diagram illustrating an example presentation of a visual representation on the grip overlaid on the smart object, in accordance with some example embodiments.

For some embodiments, the volumetric content presentation system 100 may provide a visual representation of the grip of the first user on the smart object 802 as an indication to the second user, an example of which is shown in FIG. 9A. With reference to FIG. 9A, an example presentation of a visual representation 902 on the grip overlaid on the smart object is shown. The volumetric content presentation system 100 may provide the presentation of the visual representation 902 on the first region of the grip overlaid on the smart object. The presentation of the visual representation 902 may be provided specifically by a display device (e.g., glasses 200) using an AR technology or by a display (e.g., 606) on the smart object (600). As a non-limiting example, the visual representation may be a finger-print like representation. It shall be appreciated that various different types of visual representation (e.g., solid shapes, empty shapes, shapes with dotted boundaries) may be used to represent the grip of the first user.

In some embodiments, the visual representation 902 may be presented after a detection of the touch by the second user. The second regions at which the second user touches may not at least partially overlap with the first regions of grip by the first user and the visual representation may act as an indication where the grip of the first user occurred to the second user. Alternatively, the visual representation 902 may be presented to the second user when the second regions at least partially overlap with the first regions. The visual representation may make the second user feel that he/she is accompanied by the first user.

With reference to FIG. 9B, an additional example visual representation of the grip of the first user is shown in the form of a volumetric representation of a first user gripping the object. The volumetric representation may be presented by an AR display device (e.g., the glasses 200). The presentation of the volumetric representation may include displaying one or more AR content items 904 related to the grip of the first user overlaid on the smart object. In this example, the AR content item 904 corresponds to a volumetric representation of a hand of the first user, though, in other examples, the volumetric representation of the first user may include a representation of another part of or a whole body of the first user. The presentation of the volumetric representation of the first user may also include presentation of a sound signal generated by the first user while gripping the smart object.

Figure 10B:
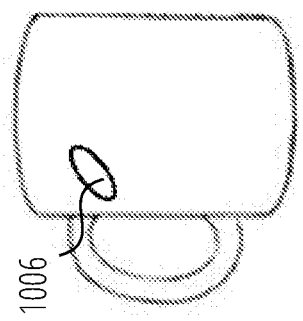
FIGS. 10A-10B are conceptual diagrams illustrating an example touch of the smart object, in accordance with some example embodiments.
Figure 10A:
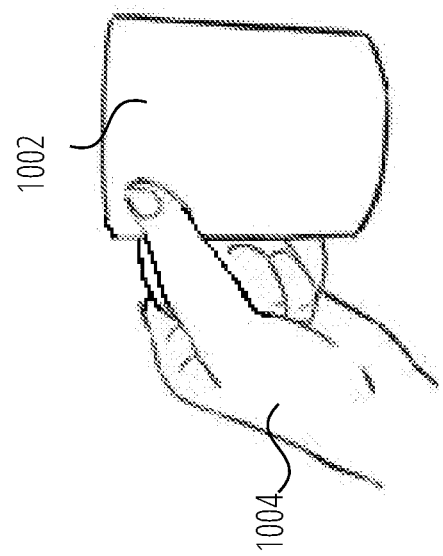

FIGS. 10A and 10B are conceptual diagrams illustrating an example touch of a smart object 1002 by a third user, in accordance with some example embodiments. The smart object 1002 is an example of the smart object 600. As shown in the FIGS. 10A and 10B, a third user may touch the smart object 1002 with one of their hands. The third user may be the same as the second user. The smart object 1002 may be the same as the smart object 802. The smart object 1002 may be the same as or different from the smart object 702. The fingers 1004 of the third user may touch the smart object 1002 on one or more third regions 1006. The volumetric content presentation system 100 may determine that the one or more third regions 1006 at least partially overlap with the one or more first regions 706 and provide a haptic and/or audio interaction with the second user.

Figure 11:
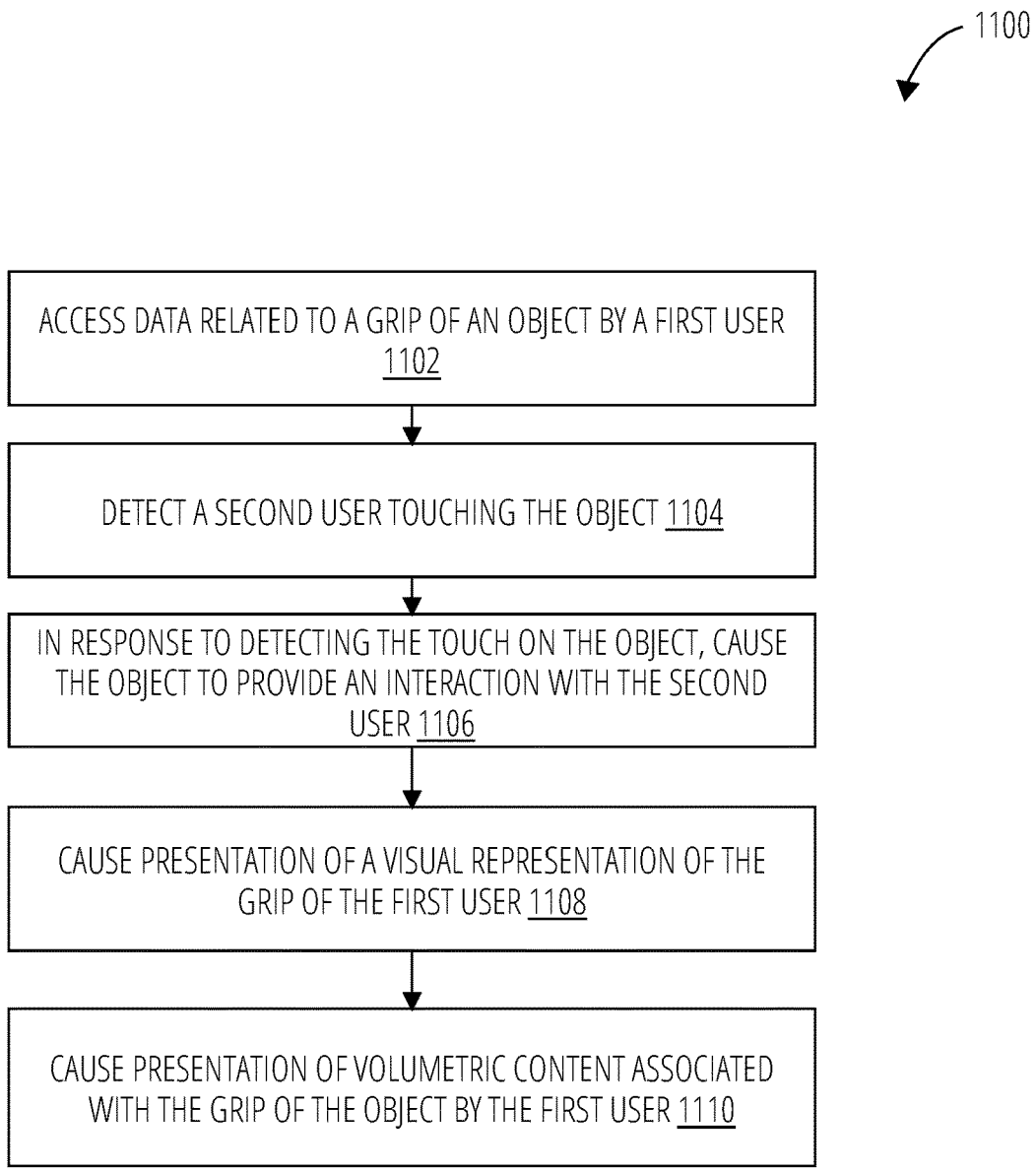
FIGS. 11-13 are flowcharts illustrating example methods for providing a touch-based experience, in accordance with some example embodiments.
Figure 12:
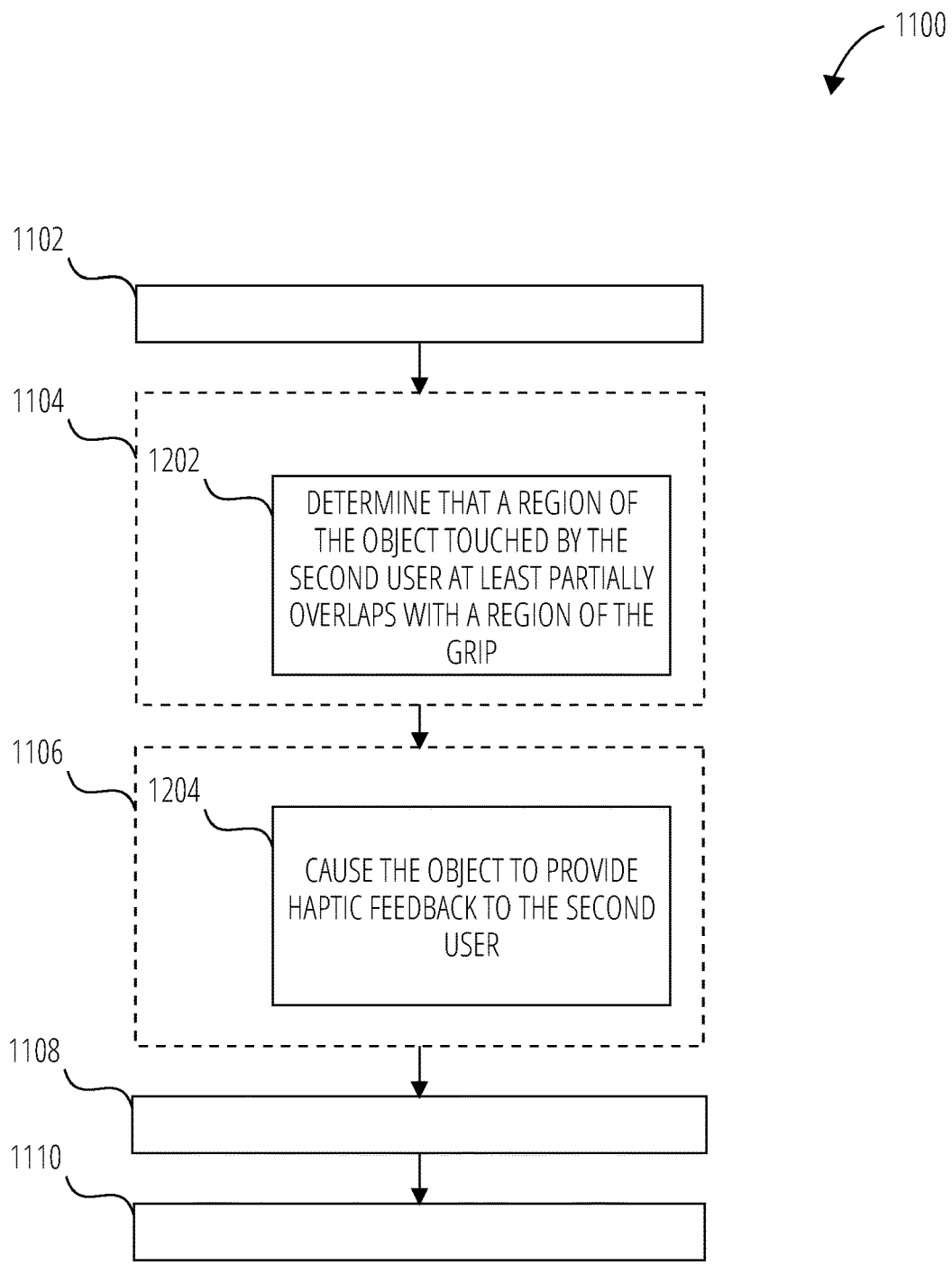
Figure 13:
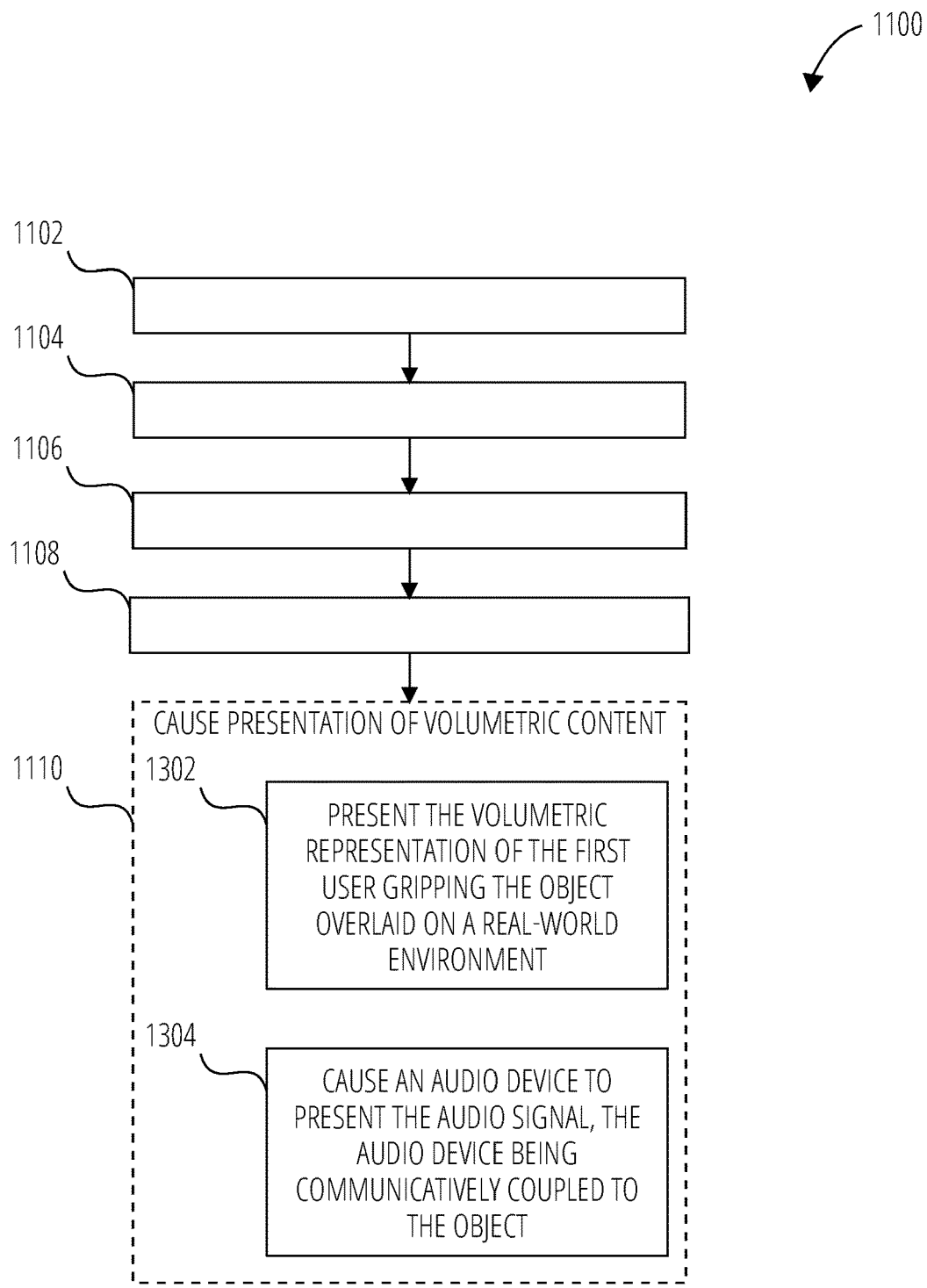

FIGS. 11-13 are flowcharts illustrating example methods for providing a touch-based experience, in accordance with some example embodiments. The method 1100 may be embodied in computer-readable instructions for execution by one or more processors such that the operations of the method 1100 may be performed in part or in whole by the functional components of the volumetric content presentation system 100; accordingly, the method 1100 is described below by way of example with reference thereto. However, it shall be appreciated that at least some of the operations of the method 1100 may be deployed on various other hardware configurations than the volumetric content presentation system 100.

In operation 1102, the volumetric content presentation system 100 may access data related to a grip of an object by a first user. The object includes one or more sensors to detect the grip of the user including detecting a location and an intensity of the grip. Hence, the data may be or include sensor data (e.g., pressure sensor data or haptic sensor data) obtained by the volumetric content presentation system 100. For some embodiments, the object may further include a memory component capable of storing historical sensor data.

For some embodiments, the volumetric content presentation system 100 may communicate directly with the object to obtain the sensor data (e.g., via a network or physical interface). Consistent with these embodiments, the object may be configured to include any one or more of a network interface or physical interface to facilitate communication with the volumetric content presentation system 100. For some embodiments, the volumetric content presentation system 100 may communicate with a third-party service to obtain the sensor data.

The data may specify an intensity of the grip (e.g., as a measure of pressure or force applied to the object), a duration of the grip, and a location of the grip on the object. For example, the data may identify a first region on the object on which the grip occurred. For some embodiments, the volumetric content presentation system 100 may determine the grip occurred on the first region of the object based on the sensor data.

In an example, the object is a coffee mug. However, it shall be appreciated that the object may be any object capable of being gripped by a user and equipped with one or more sensors for detecting the grip of the user.

In operation 1104, the volumetric content presentation system 100 detects a second user touching the object. The volumetric content presentation system 100 may detect the second user touching the object based on the sensor data generated by the one or more sensors of the object. Accordingly, the volumetric content presentation system 100 may monitor the sensor data generated by the one or more sensors to detect the touch by the second user. For some embodiments, the sensor data may include a measure of pressure applied to at least a region of the object and detecting the touch may comprise detecting satisfaction of a threshold condition based on the measure of pressure indicated by the sensor data. For example, the volumetric content presentation system 100 may determine a second user is touching the object based on the measure of pressure indicated by the sensor data exceeding a threshold measure of pressure.

For some embodiments, the object includes one or more biometric sensors or other sensors capable of providing data to identify the second user. The volumetric content presentation system 100 may identify the second user is touching the object from or based on the data from such sensors. For example, the object may provide biometric data to the volumetric content presentation system 100 and the volumetric content presentation system 100 may match the biometric data with stored biometric data associated with a user profile to identify the second user.

For some embodiments, the volumetric content presentation system 100 may detect the second user touching a second region of the object. Consistent with these embodiments, the detecting the touch by the second user further includes determining the second region at least partially overlap with the first region. For some embodiments, an overlap constraint that defines a threshold overlap may be predefined and the volumetric content presentation system 100 may determine whether an amount of overlap between the first region and the second region satisfy the overlap constraint as part of detecting the touch by the second user.

In operation 1106, the volumetric content presentation system 100 causes the object to provide an interaction with the second user in response to detecting the touch by the second user. In some examples, the interaction with the second user includes providing haptic feedback (e.g., a vibration) to the second user. Accordingly, in causing the object to provide an interaction, the volumetric content presentation system 100 causes the object to provide haptic feedback. The haptic feedback may be provided by one or more haptic components (e.g., haptic sensors and/or actuators) of the object. As noted above, the data related to the grip of the object may further include an intensity and/or duration of the grip and/or a duration. For some embodiments, the volumetric content presentation system 100 may cause the object to provide haptic feedback with an intensity and/or duration based on the intensity and/or duration of the grip by the first user.

In some examples, the data related to the grip of the object may further include an audio signal recorded during the grip of the object by the first user. In these examples, the volumetric content presentation system 100 may further cause an audio device to present the audio signal as part of providing the interaction with the second user. The audio device may be embedded in the object or may be a distinct audio device that is communicatively coupled to the object.

In some examples, a third user may touch a second object. The second object may be different from the first object but may directly communicate with the first object or have accessed or downloaded data related to the grip of the first object. The touch of the third user on the second object may be on a third region of the second object that at least partially corresponds to the first region of the first object. In response to detecting the touch on the second object, the volumetric content presentation system 100 causes the second object to provide an interaction with the third user.

In some examples, in response to detecting the touch on by the third user on the second object, the volumetric content presentation system 100 causes the first object is to provide a second interaction with the second user. In such a way, the second user is notified when the third user touches the second object.

In operation 1108, which is optional in some embodiments, the volumetric content presentation system 100 causes presentation of a visual representation (e.g., a fingerprint-like representation) of the grip of the first user overlaid on the object by a display device (e.g., glasses 200) worn by the second user in response to detecting the touch by the second user on the object. The visual representation of the grip may be displayed on the first region where the grip occurred so as to provide an indication to the second user where the grip of the first user occurred.

In operation 1110, which is optional in some embodiments, the volumetric content presentation system 100 causes presentation, by the display device, of volumetric content associated with the grip of the object by the first user. The volumetric content may include volumetric representations of one or more elements of a real-world environment in which the grip by the first user was performed. For example, the volumetric content may include a volumetric representation of the first user gripping the object.

For some embodiments, the display device is an AR device (e.g., the glasses 200) and the presentation of the volumetric content may include displaying one or more AR content items overlaid upon a real-world space, which may be the same as the three-dimensional space in which the volumetric content was captured or a different space. The presentation of the volumetric content may include displaying one or more content items in motion, displaying one or more content items performing a movement or other action, displaying one or more content items statically positioned, or combinations thereof. A content item may be displayed for a duration of the presentation of the volumetric content or a portion thereof.

The presentation of the volumetric content may also include tracking a location and movement of the second user within their physical real-world environment and using the tracked location and movement of the second user to allow the second user to move around in and interact with the presentation of the volumetric content. As such, the presentation of the volumetric content may include displaying a content item from multiple perspectives depending on the second user's movement and change in location. The location and movement of the second user may be tracked based on data from motion and position components (examples of which are described in further detail below in reference to FIG. 15) of any one or more of the display device, a primary device to which the display device is a complementary device thereof, or a complementary device (e.g., a smart watch) in communication with the display device.

Depending on the embodiment, an operation of the method 1100 may be repeated in different ways or involve intervening operations not shown. Though the operations of the method 1100 may be depicted and described in a certain order, the order in which the operations are performed may vary among embodiments, including performing certain operations in parallel. For example, for some embodiments, the volumetric content presentation system 100 may cause presentation of a visual representation of the grip of the first user prior to detecting the second user touching the object.

As shown in FIG. 12, the method 1100 can, in some embodiments, include operations 1202 and 1204. Consistent with these embodiments, the operation 1202 can be performed as part of operation 1104 where the volumetric content presentation system 100 detects a second user touching the object. In operation 1202, the volumetric content presentation system 100 determines that a region of the object touched by the second user at least partially overlaps with a region of the grip. For some embodiments, an overlap constraint that defines a threshold overlap may be predefined and the volumetric content presentation system 100 may determine whether an amount of overlap between the first region and the second region satisfy the overlap constraint as part of detecting the touch by the second user. The overlap constraint may specify a threshold amount of overlap and the volumetric content presentation system 100 may determine the amount of overlap satisfies the overlap constraint based on the amount of overlap exceeding the threshold amount of overlap.

Consistent with these embodiments, the operation 1204 can be performed as part of the operation 1106 where the volumetric content presentation system 100 causes the object to provide an interaction with the second user in response to detecting the touch by the second user. In operation 1204, the volumetric content presentation system 100 causes the object to provide haptic feedback to the second user. The haptic feedback may be provided by one or more haptic components (e.g., haptic sensors and/or actuators) of the object. As noted above, the data related to the grip of the object may further include an intensity and/or duration of the grip and/or a duration. For some embodiments, the volumetric content presentation system 100 may cause the object to provide haptic feedback with an intensity and/or duration based on the intensity and/or duration of the grip by the first user.

As shown in FIG. 13, the method 1100 can, in some embodiments, include operations 1302 and 1304. Consistent with these embodiments, the operations 1302 and 1304 can be performed as part of operation 1110 where the volumetric content presentation system 100 causes presentation of volumetric content. In operation 1302, the volumetric content presentation system 100 presents the volumetric representation of the first user gripping the object overlaid on a real-world environment. The volumetric representation of the first user gripping the object may be overlaid on the object of the second user. The volumetric representation of the first user may include displaying one or more content items in motion, displaying one or more content items performing a movement or other action, displaying one or more content items statically positioned, or combinations thereof. A content item may be displayed for a duration of the presentation of the volumetric content or a portion thereof.

In operation 1304, the volumetric content presentation system 100 causes an audio device to present an audio signal. The audio signal may be recorded during the grip of the object by the first user. The audio signal may include a speech signal of the first user or a music played by the first user while gripping the object. The audio signal may be presented concurrently with or independently of the volumetric representation in 1302 and/or the haptic feedback in 1106.

Software Architecture

Figure 14:
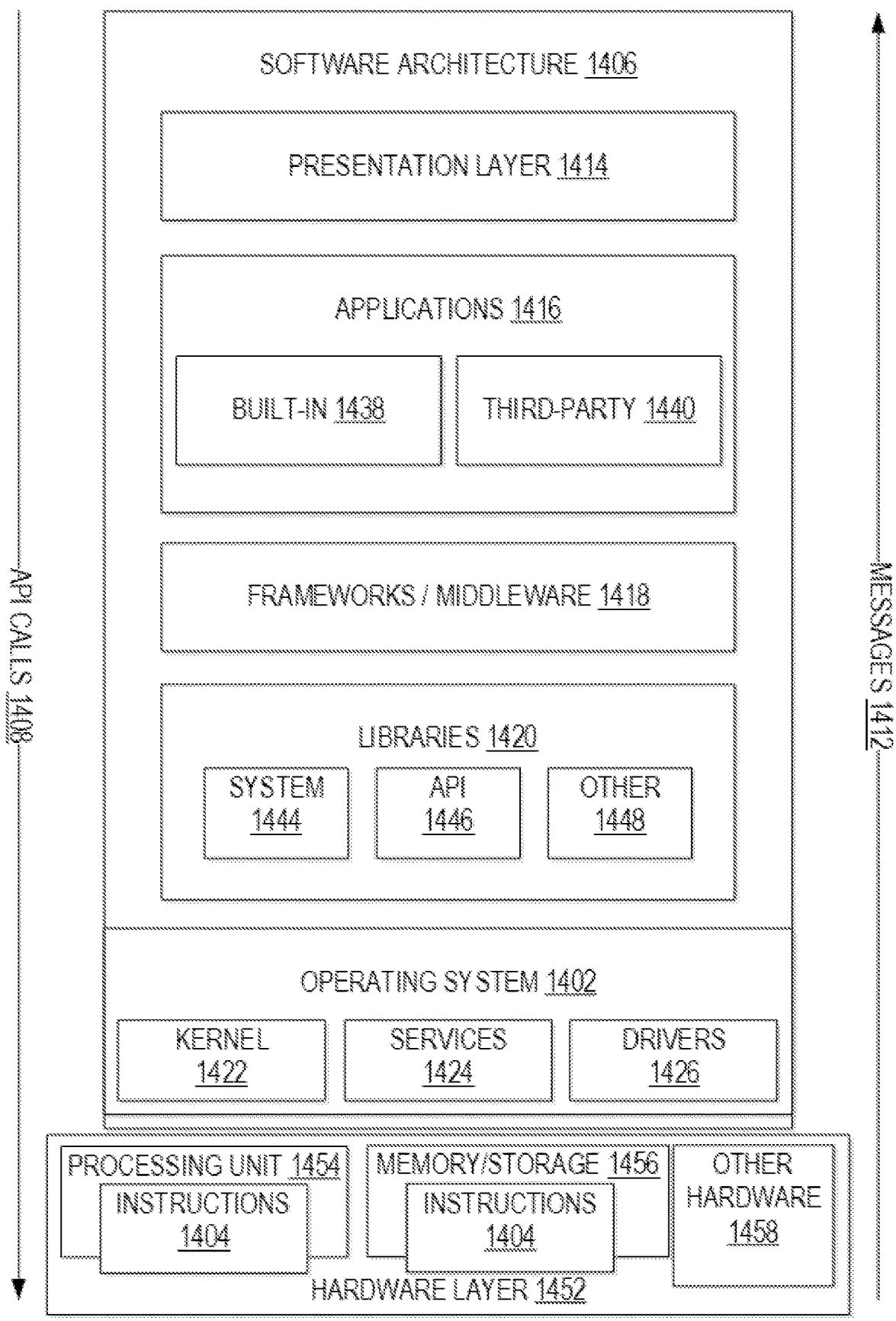
FIG. 14 is a block diagram illustrating a representative software architecture, which may be used in conjunction with various hardware architectures herein described, according to example embodiments.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors 1504, memory/storage 1506, and I/O components 1518. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes memory and/or storage modules 1456, which also have the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1414. Operationally, the applications 1416 and/or other components within the layers may invoke API calls 1408 through the software stack and receive a response to the API calls 1408 as messages 1412. The layers illustrated are representative in nature and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H.294, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 provide a higher-level common infrastructure that may be used by the applications 1416 and/or other software components/modules. For example, the frameworks/middleware 1418 may provide various GUI functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1418 to create user interfaces to interact with users of the system. Alternatively, or additionally, in some systems interactions with a user may occur through a presentation layer, such as the presentation layer 1414. In these systems, the application/component "logic" can be separated from the aspects of the application/component that interact with a user.

Figure 15:
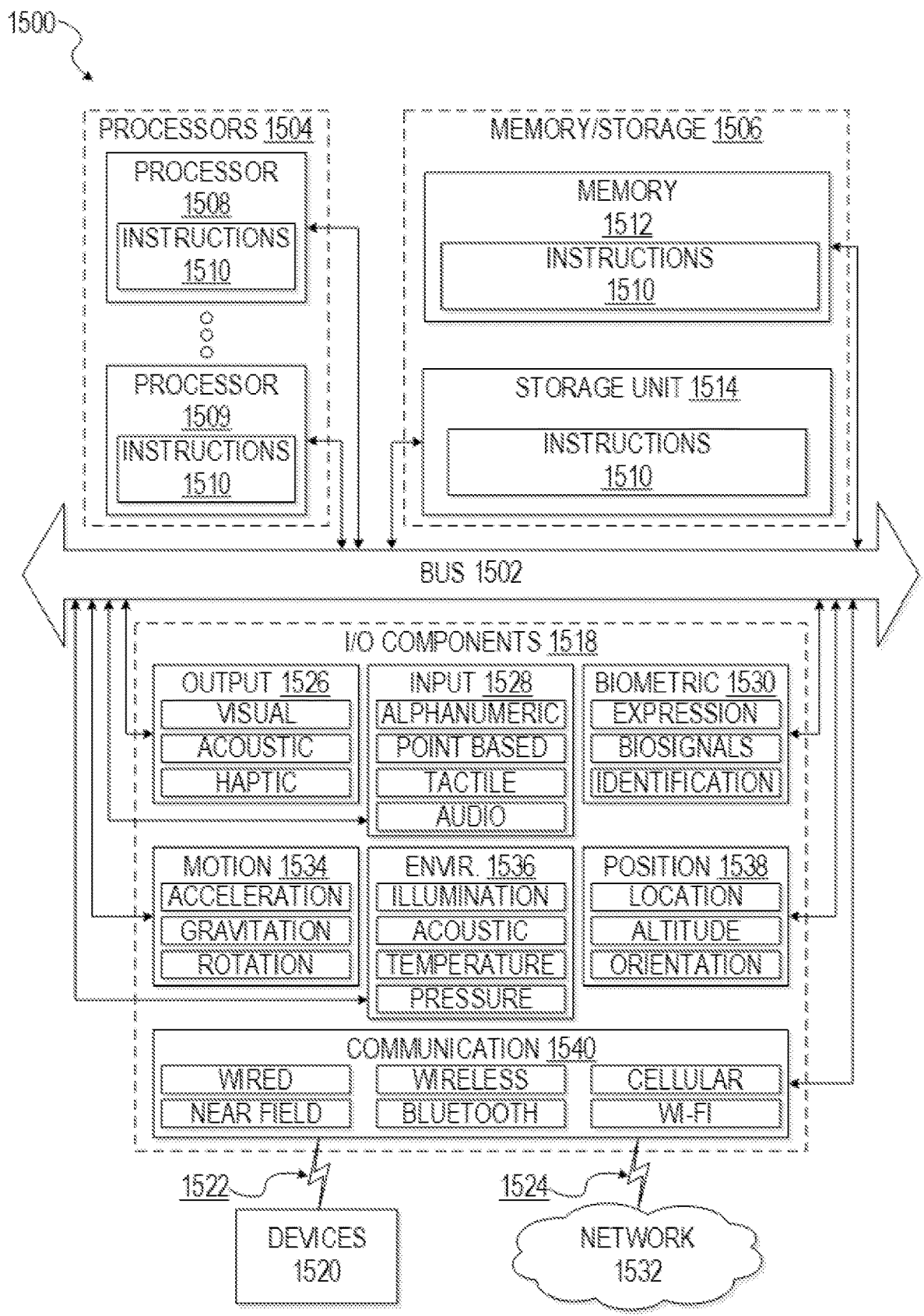
FIG. 15 is a block diagram illustrating components of a machine able to read instructions from a machine-readable medium (e.g., a machine-readable storage medium) and perform any one or more of the methodologies discussed herein, according to example embodiments.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1510 (e.g., software, a program, an application, an applet, an app, or other executable code) for causing the machine 1500 to perform any one or more of the methodologies discussed herein may be executed. As such, the instructions 1510 may be used to implement modules or components described herein. The instructions 1510 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1510, sequentially or otherwise, that specify actions to be taken by the machine 1500. Further, while only a single machine 1500 is illustrated, the term "machine" shall also be taken to include a collection of machines that individually or jointly execute the instructions 1510 to perform any one or more of the methodologies discussed herein.

The machine 1500 may include processors 1504, memory/storage 1506, and I/O components 1518, which may be configured to communicate with each other such as via a bus 1502. In an example embodiment, the processors 1504 (e.g., a CPU, a reduced instruction set computing (RISC) processor, a complex instruction set computing (CISC) processor, a (GPU, a digital signal processor (DSP), an ASIC, a radio-frequency integrated circuit (RFIC), another processor, or any suitable combination thereof) may include, for example, a processor 1508 and a processor 1509 that may execute the instructions 1510. Although FIG. 15 shows multiple processors 1504, the machine 1500 may include a single processor with a single core, a single processor with multiple cores (e.g., a multi-core processor), multiple processors with a single core, multiple processors with multiple cores, or any combination thereof.

The memory/storage 1506 may include a memory 1512, such as a main memory, or other memory storage, and a storage unit 1514, both accessible to the processors 1504 such as via the bus 1502. The storage unit 1514 and memory 1512 store the instructions 1510 embodying any one or more of the methodologies or functions described herein. The instructions 1510 may also reside, completely or partially, within the memory 1512, within the storage unit 1514, within at least one of the processors 1504 (e.g., within the processor's cache memory), or any suitable combination thereof, during execution thereof by the machine 1500. Accordingly, the memory 1512, the storage unit 1514, and the memory of the processors 1504 are examples of machine-readable media.

The I/O components 1518 may include a wide variety of components to receive input, provide output, produce output, transmit information, exchange information, capture measurements, and so on. The specific I/O components 1518 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1518 may include many other components that are not shown in FIG. 15. The I/O components 1518 are grouped according to functionality merely for simplifying the following discussion, and the grouping is in no way limiting. In various example embodiments, the I/O components 1518 may include output components 1526 and input components 1528. The output components 1526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1528 may include alphanumeric input components (e.g., a keyboard, a touch screen display configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen display that provides location and/or force of touches or touch gestures, or other tactile input components), audio input components (e.g., a microphone), and the like.

In further example embodiments, the I/O components 1518 may include biometric components 1530, motion components 1534, environment components 1536, or position components 1538, among a wide array of other components. For example, the biometric components 1530 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1534 may include acceleration sensor components (e.g., accelerometer), gravitation sensor components, rotation sensor components (e.g., gyroscope), and so forth. The environment components 1536 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1538 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1518 may include communication components 1540 operable to couple the machine 1500 to a network 1532 or devices 1520 via a coupling 1524 and a coupling 1522, respectively. For example, the communication components 1540 may include a network interface component or other suitable device to interface with the network 1532. In further examples, the communication components 1540 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1520 may be another machine or any of a wide variety of peripheral devices (e.g., a peripheral device coupled via a USB).

Moreover, the communication components 1540 may detect identifiers or include components operable to detect identifiers. For example, the communication components 1540 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4114, Ultra Code, UCC RSS-2D bar code, and other optical codes), or acoustic detection components (e.g., microphones to identify tagged audio signals). In addition, a variety of information may be derived via the communication components 1540, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a CPU, a RISC processor, a CISC processor, a GPU, a DSP, an ASIC, a RFIC, or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, (for example, giving date and time of day) sometimes accurate to a small fraction of a second.

What is claimed is:

1. A method comprising:
    accessing data associated with a grip of a real-world object by a first user, the data associated with the grip of the real-world object comprising a volumetric representation of the first user gripping the real-world object;
    detecting a second user touching the real-world object; and
    in response to detecting the second user touching the real-world object,
        causing the real-world object to provide a physical interaction with the second user based on the data associated with the grip of the real-world object by the first user; and
        causing a display device to present the volumetric representation of the first user gripping the real-world object overlaid on a real-world environment in a field of view of the second user.

2. The method of claim 1, wherein:
    the data indicates the grip of the user on a first region of the real-world object;
    the detecting of the second user touching the real-world object comprises determining a second region of the real-world object touched by the second user at least partially overlaps with the first region.

3. The method of claim 1, wherein causing the real-world object to provide the physical interaction with the second user comprises causing the real-world object to provide haptic feedback to the second user.

4. The method of claim 3, wherein:
    the data related to the grip of the real-world object comprises a measure of force applied on the real-world object by the grip,
    an intensity of the haptic feedback by the real-world object is based on the measure of the force applied on the real-world object by the grip.

5. The method of claim 3, wherein:
    the data related to the grip of the real-world object further comprises a duration of the grip; and
    a duration of the haptic feedback provided by the real-world object is based on the duration of the grip.

6. The method of claim 1, wherein:
    the data related to the grip of the real-world object further comprises an audio signal recorded during the grip of the real-world object by the first user; and
    the method further comprises:
        causing an audio device to present the audio signal, the audio device being communicatively coupled to the real-world object.

7. The method of claim 1, further comprising:
    causing presentation of a visual representation of the grip overlaid on the real-world object by a display device of the second user in response to detecting the second user touching the real-world object.

8. The method of claim 7, wherein the visual representation includes a fingerprint-like representation.

9. The method of claim 1, wherein:
    causing the display device to present the volumetric representation of the first user gripping the real-world object overlaid on a real-world environment in a field of view of the second user comprises:
        causing the display device to present the volumetric representation of the first user gripping the real-world object overlaid on the real-world object.

10. The method of claim 1, wherein:
    the real-world object is a first real-world object;
    the method further comprises:
    detecting a third user touching a second real-world object; and
    in response to detecting the third user touching the second real-world object, causing the second real-world object to provide the interaction to the third user.

11. The method of claim 10, further comprising:
    in response to detecting the third user touching the second real-world object, causing the first real-world object to provide a second interaction with the second user.

12. A system comprising:
one or more processors; and
at least one memory storing instructions that, when executed by the one or more processors, configure the system to perform operations comprising:
  accessing data associated with a grip of a real-world object by a first user, the data associated with the grip of the real-world object comprising a volumetric representation of the first user gripping the real-world object;
  detecting a second user touching the real-world object; and
  in response to detecting the second user touching the real-world object,
    causing the real-world object to provide a physical interaction with the second user based on the data associated with the grip of the real-world object by the first user; and
    causing a display device to present the volumetric representation of the first user gripping the real-world object overlaid on a real-world environment in a field of view of the second user.

13. The system of claim 12, wherein:
the data indicates the grip of the user on a first region of the real-world object;
the detecting of the second user touching the real-world object comprises determining a second region of the real-world object touched by the second user at least partially overlaps with the first region, wherein the grip on the first region and the touching on the second region are detected based on a pressure sensor or a haptic sensor mounted on the real-world object.

14. The system of claim 12, wherein causing the real-world object to provide the physical interaction with the second user comprises causing a haptic component mounted on the real-world object to provide haptic feedback to the second user.

15. The system of claim 14, wherein:
the data related to the grip of the real-world object comprises a measure of force applied on the real-world object by the grip,
an intensity of the haptic feedback by the real-world object is based on the measure of the force applied on the real-world object by the grip, wherein the measure of force applied on the real-world object is detected based on a pressure sensor or a haptic sensor mounted on the real-world object.

16. The system of claim 14, wherein:
the data related to the grip of the real-world object further comprises a duration of the grip; and
a duration of the haptic feedback provided by the real-world object is based on the duration of the grip.

17. The system of claim 12, wherein:
the data related to the grip of the real-world object further comprises an audio signal recorded during the grip of the real-world object by the first user, wherein the audio signal is recorded by an audio recording device communicatively coupled to the real-world object; and
the operations further comprise:
  causing an audio device to present the audio signal, the audio device being communicatively coupled to the real-world object.

18. The system of claim 12, further comprising:
causing presentation of a visual representation of the grip overlaid on the real-world object by a display device of the second user in response to detecting the second user touching the real-world object.

19. The system of claim 12, wherein:
the data associated with the grip of the real-world object by the first user includes a measure of pressure applied to the real-world object; and
the detection of the second user touching the real-world object comprises:
detecting satisfaction of a threshold condition based on the measure of pressure indicated by the data.

20. A non-transitory computer-readable storage medium, the computer-readable storage medium including instructions that when executed by a computer, cause the computer to perform operations comprising:
  accessing data associated with a grip of a real-world object by a first user, the data associated with the grip of the real-world object comprising a volumetric representation of the first user gripping the real-world object;
  detecting a second user touching the real-world object; and
  in response to detecting the second user touching the real-world object,
    causing the real-world object to provide a physical interaction with the second user based on the data associated with the grip of the real-world object by the first user; and
    causing a display device to present the volumetric representation of the first user gripping the real-world object overlaid on a real-world environment in a field of view of the second user.

* * * * *